United States Patent
Ito et al.

[11] Patent Number: 6,052,567
[45] Date of Patent: Apr. 18, 2000

[54] PORTABLE RADIO APPARATUS WITH COAXIAL ANTENNA FEEDER IN MICROPHONE ARM

[75] Inventors: Hiroki Ito, Kanagawa; Seijiro Ishizuka, Tokyo, both of Japan

[73] Assignee: Sony Corporation, Tokyo, Japan

[21] Appl. No.: 09/003,817

[22] Filed: Jan. 7, 1998

[30] Foreign Application Priority Data

Jan. 16, 1997 [JP] Japan ................................. 9-005890
Jun. 11, 1997 [JP] Japan ................................. 9-153398

[51] Int. Cl.⁷ .................................................. H04Q 7/20
[52] U.S. Cl. ............................ 455/90; 455/575; 455/550
[58] Field of Search ............................ 455/90, 575, 550, 455/347, 348, 351

[56] References Cited

U.S. PATENT DOCUMENTS

| | | | |
|---|---|---|---|
| 3,720,874 | 3/1973 | Gorcik et al. | 325/16 |
| 5,197,091 | 3/1993 | Takagi et al. | 379/433 |
| 5,403,197 | 4/1995 | Ernst et al. . | |
| 5,504,813 | 4/1996 | Takasaki | 379/433 |
| 5,555,449 | 9/1996 | Kim | 455/89 |
| 5,572,223 | 11/1996 | Phillips et al. . | |
| 5,977,928 | 11/1999 | Ying et al. | 343/790 |

FOREIGN PATENT DOCUMENTS 590671  9/1993  European Pat. Off. .

OTHER PUBLICATIONS

PCT Application WO 99/04500 (Hofman). Communication.

*Primary Examiner*—Edward F. Urban
*Assistant Examiner*—Tilahun Gesesse
*Attorney, Agent, or Firm*—Jay H. Maioli

[57] ABSTRACT

In a compact portable telephone, a rotational shaft portion of a microphone arm is freely rotatably coupled to the bottom portion of the housing, and it is used in a first state where the housing and the microphone arm are aligned with each other and in a second state where they are intersected to each other at a predetermined angle. A microphone and a helical antenna are contained in the microphone arm, and the length of the microphone arm is set so that the helical antenna is located at a position higher than the upper surface of the housing in the state where the microphone arm is aligned with the housing, thereby avoiding effecting the antenna by the ground conductor and the shield case of the circuit board in the housing.

12 Claims, 13 Drawing Sheets

6,052,567

PORTABLE RADIO APPARATUS WITH COAXIAL ANTENNA FEEDER IN MICROPHONE ARM

BACKGROUND OF THE INVENTION

The present invention relates to a portable radio apparatus and an antenna apparatus which are suitably used for a portable telephone.

Recently, the compact and lightweight design of portable telephones has been required in order to enhance portability, and in accordance with this requirement a small antenna has been widely used this whip type antenna is retracted in the main body when it is carried and drawn out of the main body during a telephone call.

Accordingly, damage of the antenna can be prevented when it is carried, also deterioration of radiation characteristics such as reduction in antenna gain due to the effect of a human body, particularly the head can be avoided by increasing the antenna length (effective height) during a telephone call. This will enhance, so that the telephone quality.

On the other hand, due to a further compact design of portable telephones, the distance between a transmitter (microphone) and a telephone receiver (speaker) cannot be set to be equal to the distance between the mouth and the ear of a human. Therefore, there has been proposed a portable telephone in which a microphone is separated from the main body of the portable telephone and accommodated in a rotatable portion (microphone arm) which can be retracted in and drawn out the main body, the microphone arm is retracted when it is (carried while it is drawn out when it is used for a telephone call, so that the microphone is located near to the mouth.

Further, there has been known a compact portable telephone in which an antenna is embedded in the microphone arm to enable an antenna and a microphone to be drawn out with one stroke under a telephone call as shown in FIG. 1.

That is, as shown in FIG. 1, in a conventional compact portable telephone 10, on the front surface of a housing 11 of the telephone body are usually formed an opening 12 for a telephone receiver (speaker), and operation keys 13 such as a dial key, etc. Further, a liquid crystal display element 14 is disposed between the opening 12 and the operation keys 13.

In the housing 11 is accommodated a circuit board on which an RF transmission/reception circuit, an antenna matching circuit, a voice processing circuit, etc., not shown, are mounted. The RF transmission/reception circuit and the antenna matching circuit are disposed in a shield case.

A protection plate 15 having an "L"-shaped section is provided integrally with the housing 11 at the further right side of the right-side wall 11r of the housing 11 which is formed of suitable synthetic resin material. A small-diameter rotational shaft 22a of a rotational end portion 22 of the microphone arm 21 which is formed of suitable synthetic resin material is freely rotatably engaged with the lower portion of the right-side wall 11r of the housing 11.

The microphone 23 which is embedded in a free end portion 21f of the microphone 21 is connected through a voice signal line 24 to the voice processing circuit on the circuit board, and the base portion 25b of a rod antenna 25 which is embedded in the microphone arm 21 and is formed by designing a conductor of predetermined length in a linear form is connected through a feeder spring 26 to an antenna matching circuit on the circuit board as described above.

When the portable telephone 10 is carried, the microphone arm 21 is retracted while sandwiched between the right-side wall 11r of the housing 11 and the protection plate 15 as indicated by a solid line of FIG. 1.

When the portable telephone 10 is under the telephone call, as shown by a chain line of FIG. 1, the microphone arm 21 is rotated in a counterclockwise direction from the retracted state as described above, ani drawn out so that the microphone 23 and the housing 11 are intersected to each other at a suitable obtuse angle and the microphone 23 and (the opening for) the speaker 12 are kept to be away from each other at a predetermined distance. In addition, deterioration of radiation characteristics such as reduction in antenna gain, etc. due to the effect of the human head is avoided.

In such a state that the microphone arm 21 is drawn out as described above, the microphone 23 is located at a lower position than the bottom surface 11b of the housing 11 in FIG. 1.

Further, by disposing a rod antenna 25 in the microphone arm 21, the portable telephone 10 as described above needs no antenna accommodating space in the housing 11, and this is effective to miniaturize the portable telephone 10. Still further, if the rod antenna 25 of super elastic member such as Ni—Ti alloy, for example, this is effective to reinforce the microphone arm 21.

In the conventional compact portable telephone 10 as described above, however, the free end portion 21f is not located at a higher position than the upper surface lit of the housing 11 in the figure in the state where the microphone arm 21 is retracted. Accordingly, the rod antenna 25 is located so as to be proximate to the ground conductor of the circuit board and the shield case through the right-side wall 11r of the housing 11 over the entire length thereof. Therefore, the input impedance of the rod antenna 25 is greatly increased, and thus the rod antenna 25 does not establish the match with a feeding system which is represented by a feeder spring 26, so that the matching loss therebetween is increased and no excellent antenna characteristic can be obtained.

SUMMARY OF THE INVENTION

In view of the foregoing, an object of the present invention is to provide a portable radio apparatus and an antenna apparatus which can provide excellent antenna characteristics even in the state where a microphone arm containing an antenna therein is retracted.

In order to solve the problem, a portable radio apparatus according to the first aspect of the present invention in which a cylindrical body containing an antenna and a microphone therein is freely rotatably coupled to the side portion of the housing of a radio apparatus body at one end portion in the central axis direction thereof, and which is used both in the first state where the housing and the cylindrical body are aligned, and in the second state where the housing and the cylindrical body are intersected to each other at a predetermined angle, is characterized in that the other end portion of the cylindrical body in the center axis direction is projected outwardly from the end edge of the housing in the first state, and the antenna is embedded into the other portion of the cylindrical body in the center axis direction.

Further, a portable radio apparatus; according to the second aspect of the present invention in which a cylindrical body containing an antenna and a microphone therein is freely rotatably coupled to the side portion of the housing of a radio apparatus body at one end portion in the central axis direction thereof, and which is used both in the first state where the housing and the cylindrical body are aligned, and in the second state where the housing and the cylindrical body are intersected to each other at a predetermined angle, is characterized in that the other end portion of the cylindrical body in the center axis direction is located outwardly from the end edge of the housing in the first state, the first antenna is embedded in the other portion of the cylindrical body in the center axis direction, the second antenna is embedded in one end side of the cylindrical body in the center axis direction, and selective feeding means for selectively supplying power to the first and second antennas is provided.

An antenna apparatus according to the third aspect of the present invention which includes an antenna conductor which is contained in a cylindrical body together with a microphone, the cylindrical body being freely rotatably coupled to the side portion of a radio apparatus body, and is used both in the first state where the housing and the cylindrical body are aligned, and in the second state where the housing and the cylindrical body are intersected to each other at a predetermined angle, is characterized in that the other end portion of the cylindrical body at the opposite side to the rotational shaft side ir the center axis direction is projected outwardly from the end edge of the housing in the first state, and the antenna conductor is embedded in the other end portion which is projected.

An antenna apparatus according to a fourth aspect of the present invention which includes ar antenna conductor which is contained in a cylindrical body together with a microphone, the cylindrical body being freely rotatably coupled to the side portion of a radio apparatus body, and is used both in the first state where the housing and the cylindrical body are aligned, and in the second state where the housing and the cylindrical body are intersected to each other at a predetermined angle, is characterized in that the other end portion of the cylindrical body at the opposite side to the rotational shaft side in the center axis direction is projected outwardly from the end edge of the housing in the first state, the first antenna conductor is embedded in the other end portion which is projected, and the second antenna conductor is embedded at the rotational shaft side of the cylindrical body, wherein power is selectively supplied to the first and second antenna conductors.

In the portable radio apparatus and the antenna apparatus thus constructed, the antenna is located at the cylindrical portion which projects from the end edge of the housing of the main body of the radio apparatus, so that the antenna can gain an excellent and sufficient gain even in the first state where the housing and the cylindrical body are aligned with each other.

DETAILED DESCRIPTION OF THE PREFERRED EMBODIMENT

The embodiments of the antenna apparatus according to the present invention will be described with reference to FIGS. 2 and 3.

[Construction of the Embodiments]

Figure 1:
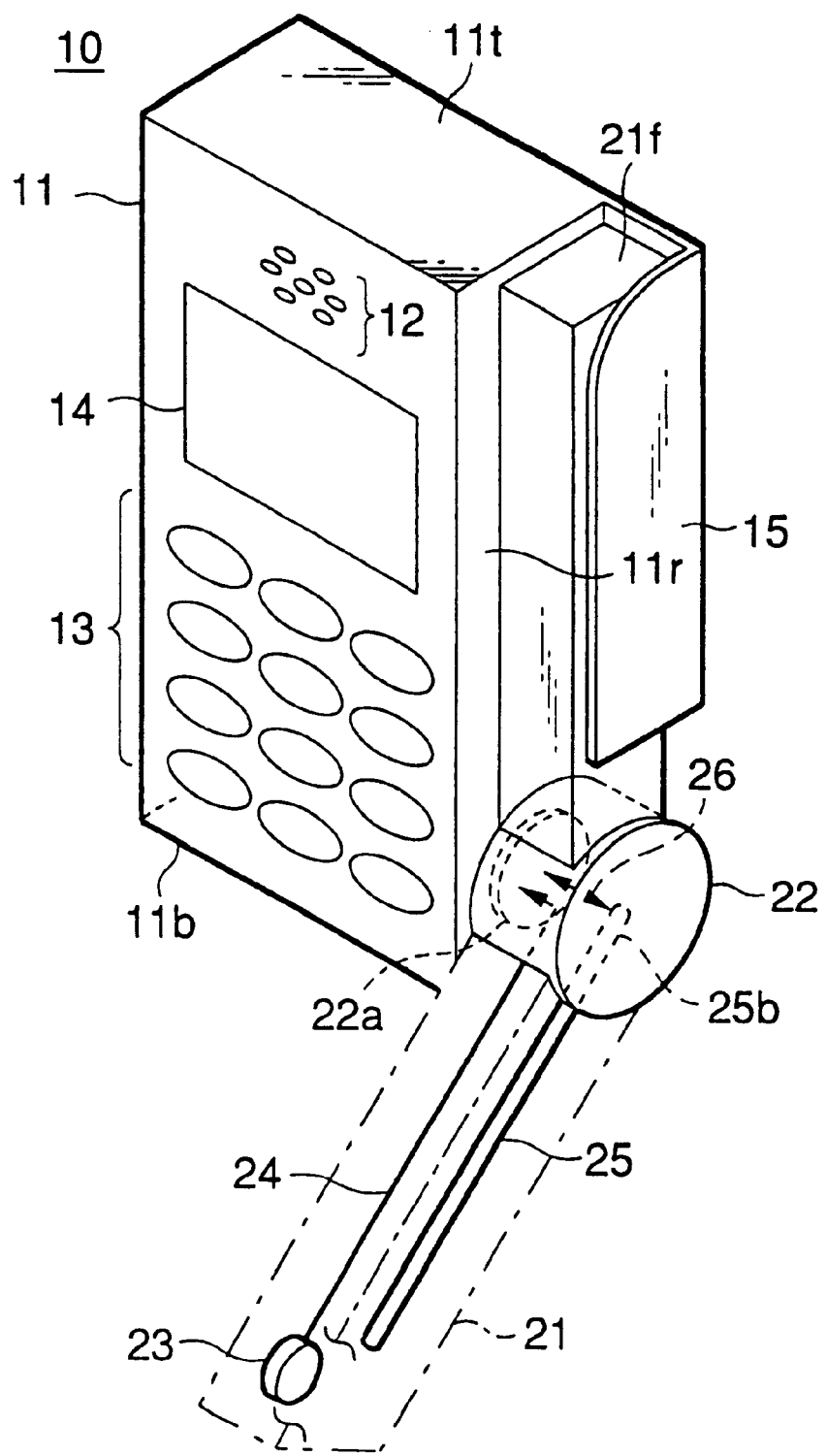
FIG. 1 is a perspective view showing the conceptual construction of a conventional portable telephone.
Figure 2:
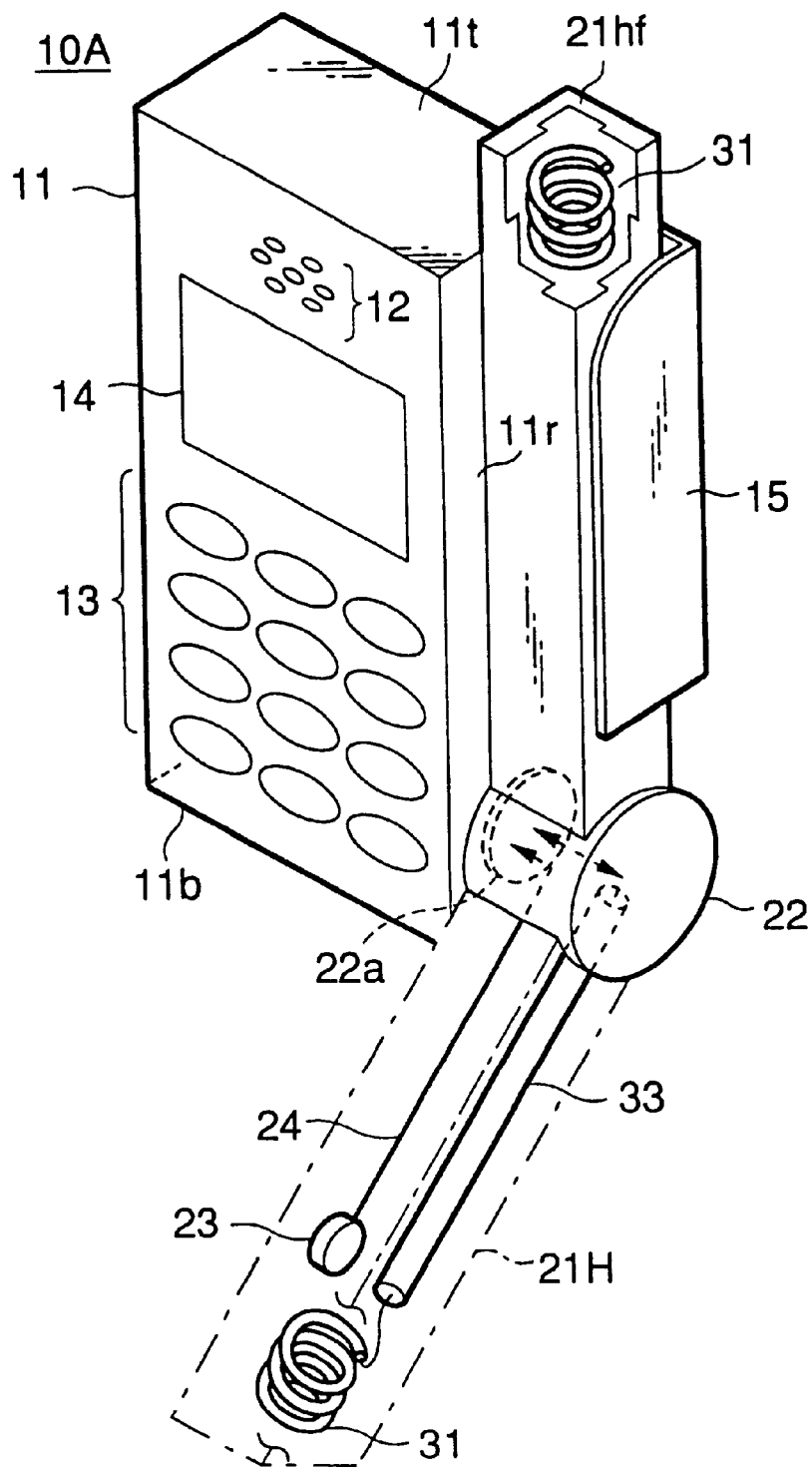
FIG. 2 is a perspective view showing the basic construction of an embodiment of a portable radio apparatus according to the present invention.
Figure 3:
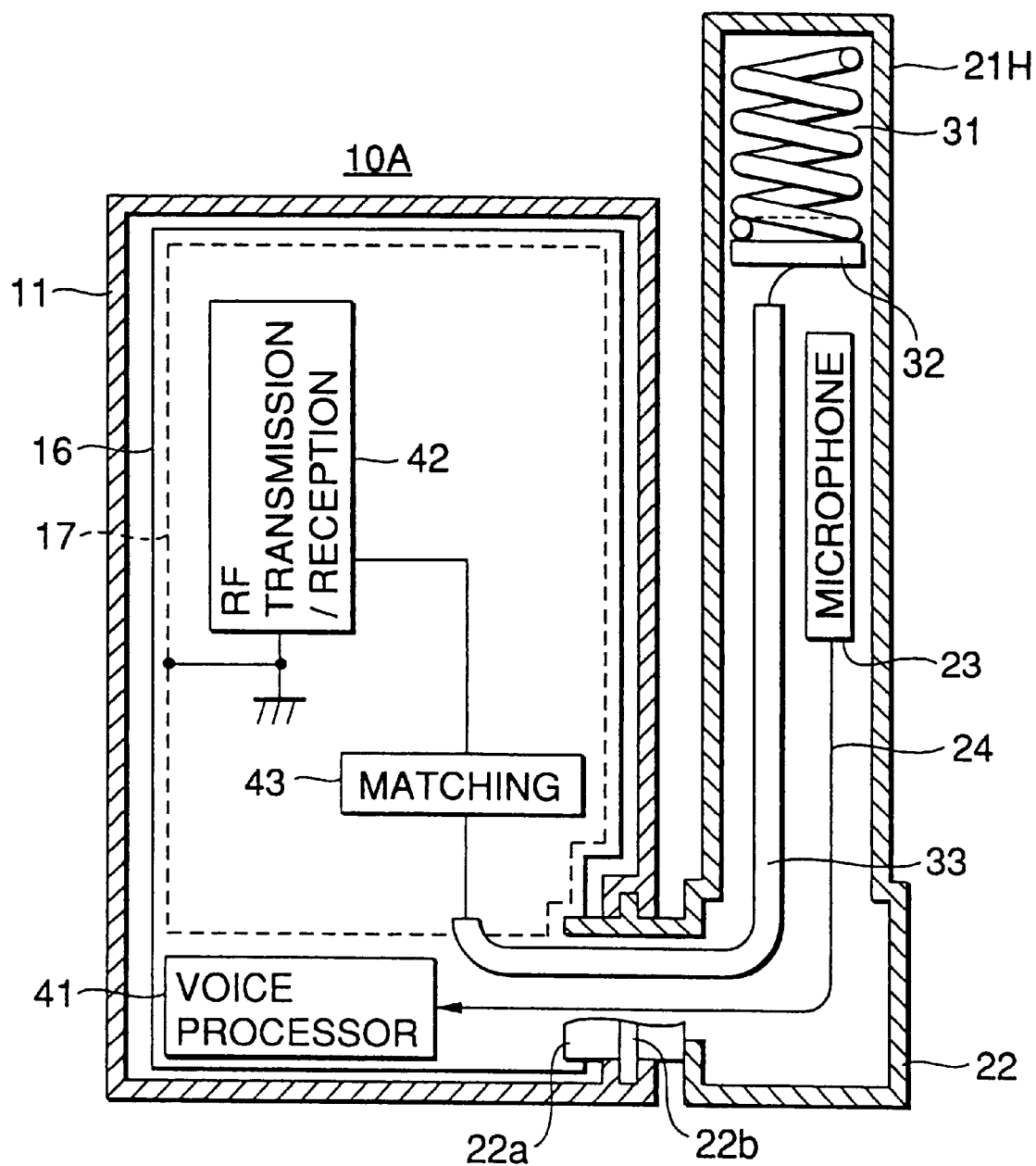
FIG. 3 is a conceptual diagram showing the specific construction of the main part of the embodiment according to the present invention.

The basic construction of the embodiments according to the present invention is shown in FIG. 2, and the specific construction thereof is shown in FIG. 3. In FIGS. 2 and 3, the portions corresponding to those of FIG. 1 are represented by the same reference numerals, and the description thereof is partially omitted.

In FIG. 2, in a compact portable telephone 10A, at the front side of the housing 11 of the main body of the telephone is formed an opening 12 for a telephone receiver (speaker) and also disposed operation keys 13 such as dial keys, etc. Further, a liquid crystal display element 14 is disposed between the opening 12 and the operation keys 13.

A protection plate 15 having an "L"-shaped section is provided integrally with the housing 11 at the further right side of the right-side wall 11r of the housing 11 which is formed of suitable synthetic resin material. Further, a small-diameter rotational shaft $22a$ of a rotational end portion of a microphone arm 21H which is formed of suitable synthetic resin material is freely rotatably held at the lower portion of the right-side wall 11r of the housing 11 in a predetermined angle range.

In this embodiment, the length of the microphone arm 21H is set so that the free end portion $21hf$ of the microphone arm 21H is projected more upwardly from the upper surface $11t$ of the housing 11 in the state where the microphone arm 21H is accommodated between the right-side wall 11r of the housing 11 and the protection plate 15. In addition, in place of the conventional rod antenna 25 shown in FIG. 1, a helical antenna 31 obtained by designing a conductor in a spiral form at predetermined turn diameter, axis length and turn number is contained in the free end portion $21hf$ which projects upwardly.

The microphone 23 is located at a position nearer to the rotational end portion 22 than the helical antenna 31, and as indicated by a chain line of FIG. 1, it is kept far away from (the opening for) the speaker 12 at the predetermined distance as described above while the microphone arm 21H is drawn out.

As shown in FIG. 3, the helical antenna 31 is electrically and mechanically coupled to a support fitting 32 at the base portion thereof, and the support fitting 32 is connected to a coaxial feeder 33. The coaxial feeder 33 and the voice signal line 24 connected to the microphone 23 are passed through the inside of the rotational shaft 22a of the microphone arm 21H and guided into the housing 11.

A voice processing circuit 41, an RF transmission/reception circuit 42 and an antenna matching circuit 43 are mounted on the circuit board 16 accommodated in the housing 11, and the RF transmission/reception circuit 42 and the antenna matching circuit 43 are disposed in a shield case 17.

The input/output impedance (characteristic impedance) of the RF transmission/reception circuit 42 is ordinarily set to 50 Ω.

The voice signal line 24 from the microphone 23 is connected to the voice processing circuit 41, and the coaxial feeder 33 from the helical antenna 31 is passed through the antenna matching circuit 43 and connected to the RF transmission/reception circuit 42.

A flange portion 22b is formed integrally with the outside of the rotational shaft 22a of the microphone arm 21H in conformity with the predetermined rotational range, and when the microphone arm 21H is drawn out as indicated by a chain line of FIG. 2, the rotational angle thereof is restricted in cooperation with a hooking member of the housing 11 side (omitted from the illustration).

The microphone arm 21H is fixed at the positions as indicated by a solid line and a chain line of FIG. 2 respectively by a suitable cam mechanism (omitted from illustration). In FIG. 3, the protection plate 15 is omitted.

[Operation of the First Embodiment]

Next, the operation of the embodiment of the present invention will be described.

At a carry-on state where the portable telephone 10A is on standby, the microphone arm 21H is accommodates while sandwiched between the right-side wall 11r of the housing 11 and the protection plate 15 as indicated by the solid line of FIG. 2.

In this state, the ground conductor (omitted from the illustration) of the circuit board 16 and the shield case 17 are kept not to be approximate to the helical antenna 31 over the entire length thereof as shown in FIG. 3. Therefore, there is no case where the input impedance rises up, and the helical antenna 31 normally operates as a monopole antenna with the ground conductor and the shield case 17 of the circuit board 16 acting as the ground. When the portable telephone 10A is under a telephone call, as indicated by the chain line of FIG. 2, the microphone arm 21H is rotated in the counterclockwise direction from the retracted state as described above, and drawn out so that the microphone 23 and the housing 11 intersect to each other at a suitable obtuse angle, so that the microphone 23 and (the opening for) the speaker 12 are kept to be far away from each other at a predetermined distance.

In this state, even when the helical antenna 31 is located at a position lower than the microphone 23, it is also far away from the mouth of a user, and thus it can be avoids the effect of the human head. Therefore, the helical antenna 31 normally operates as a monopole antenna with the ground conductor and the shield case 17 of the circuit board 16 acting as the ground.

As described above, in this embodiment, the helical antenna 31 which is contained in the free end portion 21hf is projected upwardly from the upper surface lit of the housing 11 in the state where the microphone arm 21H is accommodated. Therefore, the effect of the ground conductor of the circuit board 16 contained in the(housing 11 and the shield case 17 on the input impedance of the helical antenna 31 is suppressed and thus the excellent antenna characteristics can be obtained when the microphone arm 21H is retracted and drawn out.

[Construction of Second Embodiment]

Next, the second embodiment of the antenna apparatus according to the present invention will be described with reference to FIG. 4.

Figure 4:
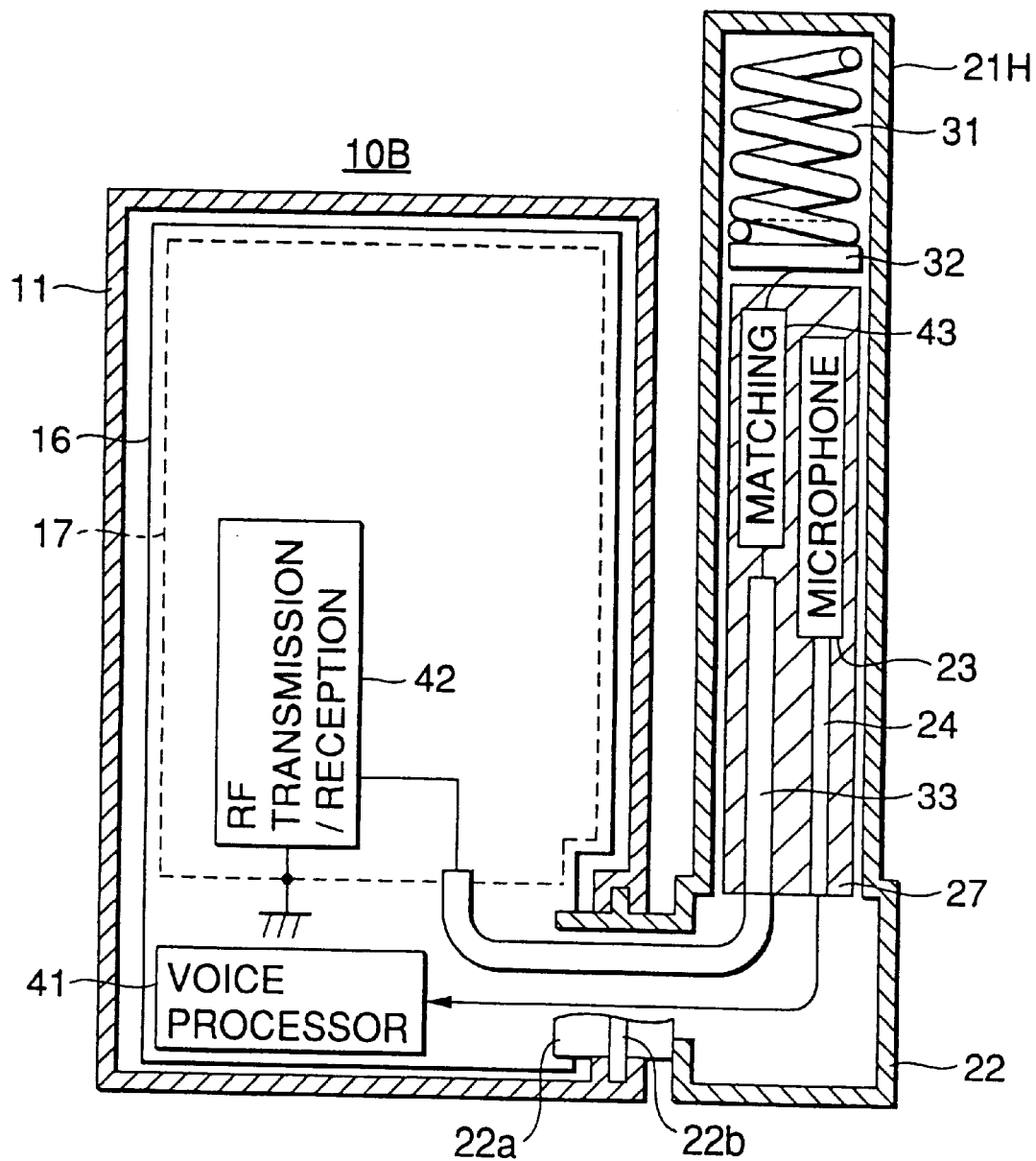
FIG. 4 is a conceptual diagram showing the specific construction of the main part of the second embodiment of the present invention.

The specific construction of the second embodiment according to the present invention is shown in FIG. 4. In FIG. 4, the portions corresponding to those of FIG. 3 are represented by the same reference numerals, and the description of a part thereof is omitted.

The basic construction of this embodiment is the same as shown in FIG. 2.

In the embodiment of FIG. 4, in a compact portable telephone 10B, the rotational shaft 22a of the rotational end portion 22 of the microphone arm 21H formed of a suitable synthetic resin material is held at the lower end portion of the right side of the housing 11 formed of a suitable synthetic resin material so as to be freely rotatable in a predetermined angle range.

In the retracted state where the housing 11 and the microphone arm 21H are aligned with each other as shown in FIG. 4, the length of the microphone arm 21H is set so that the free end portion of the microphone arm 21H is upwardly projected from the upper end of the housing 11 in the figure, and the helical antenna 31 in which the conductor is spirally formed in the free end portion is coupled to the support fitting 32 at the base portion thereof.

The microphone 23 is disposed to be nearer to the rotational end portion 22 than the support fitting 32 of the helical antenna 31, and it is kept away from the speaker at the predetermined distance as described above while the microphone arm 21H is drawn out as indicated by the chain line of FIG. 2.

In this embodiment, a ground plate 27 formed of a print wiring plate is contained at the middle portion of the microphone arm 21H, and the matching circuit 43 is formed at the helical antenna 31 side on the ground plate 27. One end of the matching circuit 43 is connected to the support fitting 32 of the helical antenna 31, and the other end of the matching circuit 43 is connected to the coaxial feeder 33. The coaxial feeder 33 and the voice signal line 24 connected to the microphone 23 are passed through the inside of the rotational shaft 22a of the microphone arm 21H, guided into the housing 11, and then connected to the RF transmission/reception circuit 42 and the voice processor circuit 41 which are mounted on the circuit board 16. The ground conductor (omitted from the illustration) of the circuit board 16, the shield case 17 and the ground plate 27 in the microphone arm 21H are electrically connected to one another through the outer conductor of the coaxial feeder 33.

As described above, in this embodiment, by disposing the antenna matching circuit 43 just near to the helical antenna 31, a general 50 Ω semi-ridge coaxial cable can be easily used for the antenna feeder 33 in conformity with the characteristic impedance of the RF transmission/reception circuit 42 which is ordinarily 50 Ω, and the cost can be reduced.

A flange portion 22b is integrally formed at the outside of the rotational shaft 22a of the microphone arm 21H in conformity with a predetermined rotational range, and in cooperation with a hook member (omitted from the illustration) at the housing 11 side, the rotational angle thereof is restricted when the microphone arm 21H is drawn out as indicated by the chain line of FIG. 2.

Further, the microphone arm 21H is fixed at the positions as indicated by the solid line and the chain line of FIG. 2 respectively by a suitable can mechanism (omitted from the illustration). The protection plate 15 shown in FIG. 2 is also omitted from FIG. 4.

[Operation of Second Embodiment]

Next, the operation of the second embodiment according to the present invention will be described.

At the carry-on state where the portable telephone 10B is on standby, the microphone arm 21H is retracted while sandwiched between the right-side wall 11r of the housing 11 and the protection plate 15 as indicated by the solid line of FIG. 2.

In this state, the ground conductor (omitted from the illustration) of the circuit board 16 ani the shield case 17 do not approach to the helical antenna 31 over the overall length thereof as shown in FIG. 4. Therefore, the input impedance does not increase and thus the helical antenna 31 normally operates as a monopole antenna in a more stable matched state with the ground conductor and the shield case 17 of the circuit board 16 and the ground plate 27 acting as the ground.

When the portable telephone 10B is; under a telephone call, as indicated by the chain line of FIG. 2, the microphone arm 21H is rotated counterclockwise from the retraction state as described above and drawn out so that the microphone 23 and the housing 11 intersect to each other at a suitable obtuse angle, whereby the microphone 23 and the speaker are kept away from each other at a predetermined distance.

In this state, the helical antenna 31 is located at a position lower than the microphone 23 and it is far away from the mouth of a user, so that it avoids the effect of the human head. Therefore, the helical antenna 31 normally operates as a monopole antenna with the ground conductor and the shield case 17 of the circuit board 16 and the ground plate 27 acting as the ground.

Particularly, since the ground plate 27 is disposed within the microphone arm 21H, it effectively operates as the ground of the helical antenna 31 during the telephone call, and thus the electrical characteristics of the helical antenna 31 is more stabilized.

As described above, in the embodiment of FIG. 4, in the state where the microphone arm 21H is retracted, the helical antenna 31 embedded in the free end por-ion 21hf thereof is projected upwardly from the upper end of the housing 11, and the ground plate 27 is disposed in the microphone arm 21H. Therefore, when the microphone arm 21H is retracted, the effect of the ground conductor and the shield case 17 of the circuit board 16 embedded in the housing 11 on the input impedance of the helical antenna 31 is suppressed to obtain excellent antenna characteristics.

During the telephone call in which the microphone arm 21H is drawn out, the ground plates 27 particularly effectively acts to stabilize the electrical characteristics of the helical antenna 31 more.

Further, since the antenna matching circuit 43 is disposed just near to the helical antenna 31 on the ground plate 27, the matching is easier and the characteristics of the helical antenna 31 is more stabilized in cooperation with the ground plate 27.

[Construction of Third Embodiment]

Next, the third embodiment of the antenna apparatus according to the present invention will be described with reference to FIG. 5.

Figure 5:
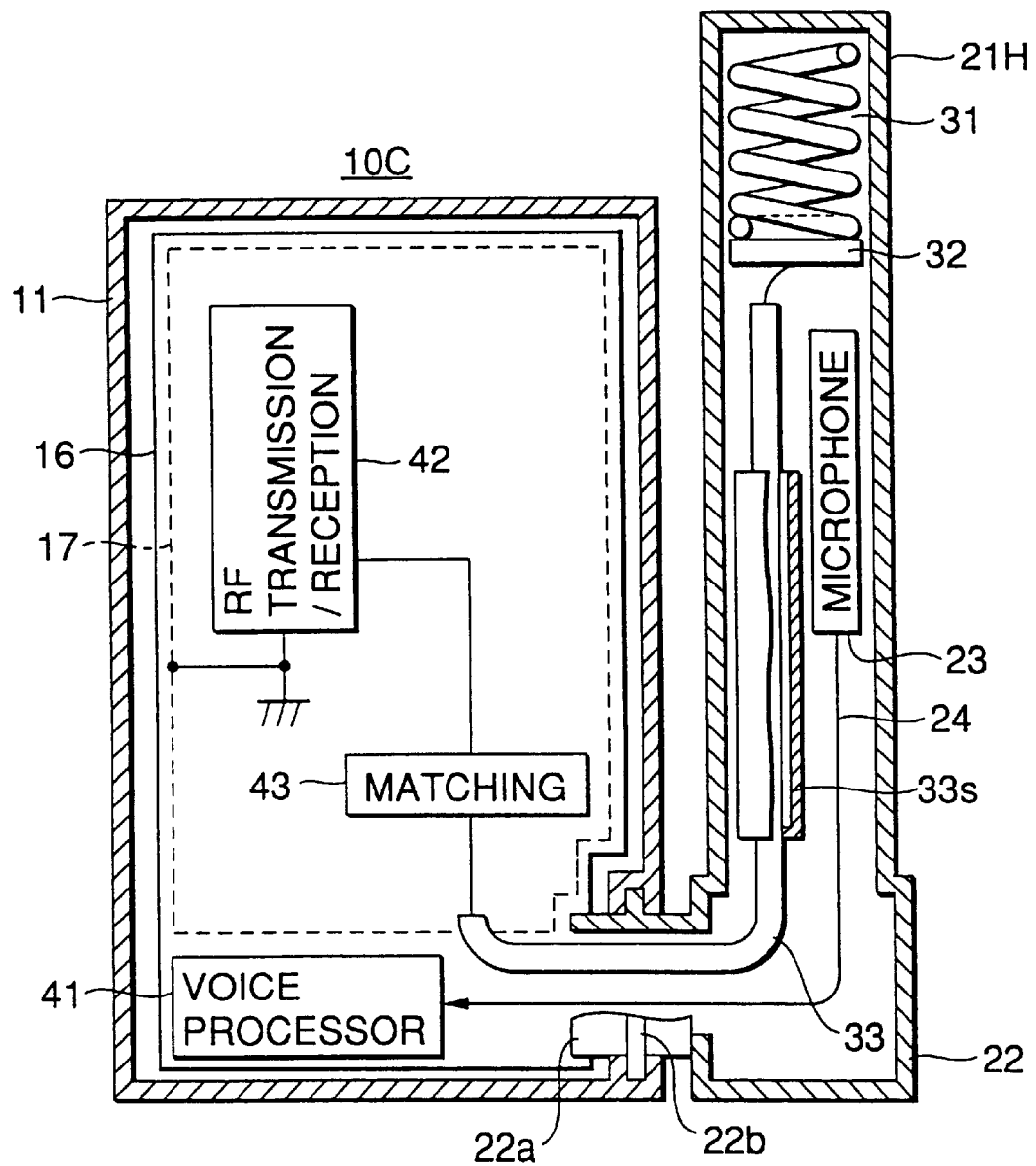
FIG. 5 is a conceptual diagram showing the specific construction of the main part of the third embodiment of the present invention.

The construction of the third embodiment is shown in FIG. 5. In FIG. 5, the portions corresponding to FIGS. 2 to 4 are represented by the same reference numerals, and the description of a part thereof is omitted.

The basic construction of the embodiment is the same as FIG. 2.

In the embodiment of FIG. 5, a compact portable telephone 10C is designed so that the rotational shaft 22a of the rotational end portion 22 of the microphone arm 21H formed of a suitable synthetic resin is held at the lower end portion of the right side of the housing 11 formed of a suitable synthetic resin so as to be freely rotatable in a predetermined angle range.

In the retraction state where the housing 11 and the microphone arm 21H are aligned with each other as shown in FIG. 5, the length of the microphone arm 21H is set so that the free end portion of the microphone arm 21H is upwardly projected from the upper end of the housing 11 in the figure, and also the helical antenna 31 in which the conductor is spirally formed is contained in the free end portion.

The microphone 23 is disposed to be nearer to the rotational end portion 22 than the helical antenna 31, and as indicated by the chain line of FIG. 2, it is kept away from the speaker at the predetermined distance as described above while the microphone arm 21H is drawn out.

The helical antenna 31 is coupled to the support fitting 32 at the base portion thereof, and the support fitting 32 is connected to the coaxial feeder 33. The coaxial feeder 33 and the voice signal line 24 connected to the microphone 23 are passed through the rotational shaft 22a of the microphone arm 21H and guided into the housing 11.

A voice processing circuit 41, an RF transmission/reception circuit 42 and an antenna matching circuit 43 are mounted on the circuit board 16 accommodated in the housing 11, and the RF transmission/reception circuit 42 and the antenna matching circuit 43 are disposed in the shield case 17.

The voice signal line 24 from the microphone 23 is connected to the voice processing circuit 41, and the coaxial feeder 33 from the helical antenna 31 is passed through the antenna matching circuit 43 and connected to the RF transmission/reception circuit 42.

In this embodiment, a pipe-shaped outer sheath conductor 33s having a length of quarter wavelength is disposed at the outside of the coaxial feeder 33 coaxially with the coaxial feeder 33. One end of the outer sheath conductor 33s and the outer conductor of the coaxial feeder 33 are connected to each other at the rotational end portion 22 side, and also the other of the outer sheath conductor 33s is electrically opened, and so-called Sperre top is formed.

In this case, the coaxial feeder 33 is formed as a semi-ridge cable.

A flange portion 22b is formed at the outside of the rotational shaft 22a of the microphone arm 21H integrally with the rotational shaft 22a in correspondence with a predetermined rotational range, and the rotational angle thereof is restricted in cooperation of a hook member (omitted from the illustration) at the housing 11 side when the microphone arm 21H is drawn out as indicated by the chain line of FIG. 2.

The microphone arm 21H is fixed at the positions as indicated by the solid line and respectively the chain line of FIG. 2 by a suitable cam mechanism (omitted from the illustration). The protection plate 15 shown in FIG. 2 is also omitted from FIG. 5.

[Operation of Third Embodiment]

Next, the operation of the third embodiment according to the present invention will be described.

At the carry-on state where the portable telephone 10C is on standby, the microphone arm 21H is retracted in alignment with the right-side wall of the housing 11 as shown in FIG. 5.

In this state, the ground conductor (omitted from the illustration) and the shield case 17 of the circuit board 16 are not approximate to the microphone arm 21H over the entire length of the helical antenna 31, and thus the input impedance is not increased, so that the helical antenna 31 normally operates as a monopole antenna with the ground conductor and the shield case 17 of the circuit board 16 acting as the ground in the more stable matched state.

Further, at the telephone call time of the portable telephone 10C as indicated by the chain line of FIG. 2, the microphone arm 21H is rotated in the counterclockwise direction from the retraction state as described above, and drawn out so that the microphone 23 and the housing 11 are intersected to each other at a suitable obtuse angle, whereby the microphone 23 and the speaker are kept away from each other at a predetermined distance.

In this state, the helical antenna 31 is located at a position lower than the microphone 23, and separated from the mouth side of the user, so that it can avoid the effects of the human head. Therefore, the helical antenna 31 normally operates as a monopole antenna with the ground conductor and the shield case 17 of the circuit board 16 as the ground.

In this embodiment, the outer conductor of the coaxial feeder 33 and one end of the outer sheath conductor 33s are connected to each other to form Sperre top. Therefore, even when the helical antenna 31 is a half-wavelength ($\lambda/2$) type antenna, the current flowing into the (ground conductor and the shield case 17 of the circuit board 16 is suppressed, so that the antenna characteristics are stabilized even in the telephone call state where the user grips the portable telephone 10C.

As described above, in the embodiment shown in FIG. 5, the helical antenna 31 contained in the free end portion of the microphone arm 21H is projected upwardly from the upper end of the housing 11 in the state where the microphone arm 21H is retracted. Therefore, the effect on the input impedance of the helical antenna 31 by the ground conductor and the shield case 17 of the circuit board 16 contained in the housing 11 is suppressed, and the excellent characteristics can be obtained when the microphone arm 21H is retracted and when the microphone arm 21H is drawn out.

Further, since the outer sheath conductor 33s is connected to the outer conductor of the coaxial feeder 33 to form Sperre top, the stable antenna characteristics can be obtained even in the telephone call.

[Construction of Fourth Embodiment]

Next, the fourth embodiment of the antenna apparatus according to the present invention will be described with reference to FIGS. 6 and 7.

Figure 6:
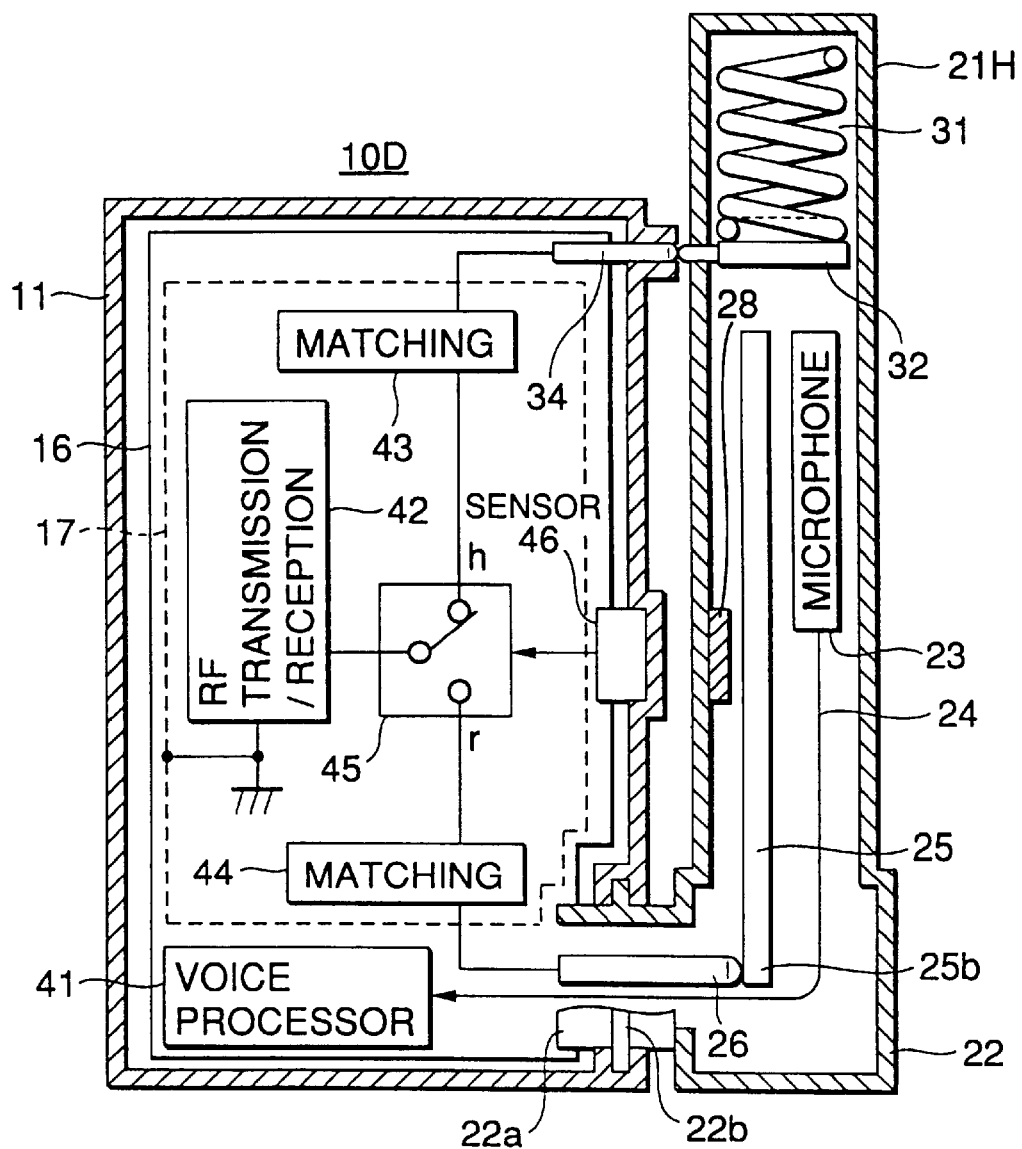
FIG. 6 is a conceptual diagram showing the specific construction of the main part of the fourth embodiment of the present invention.
Figure 7:
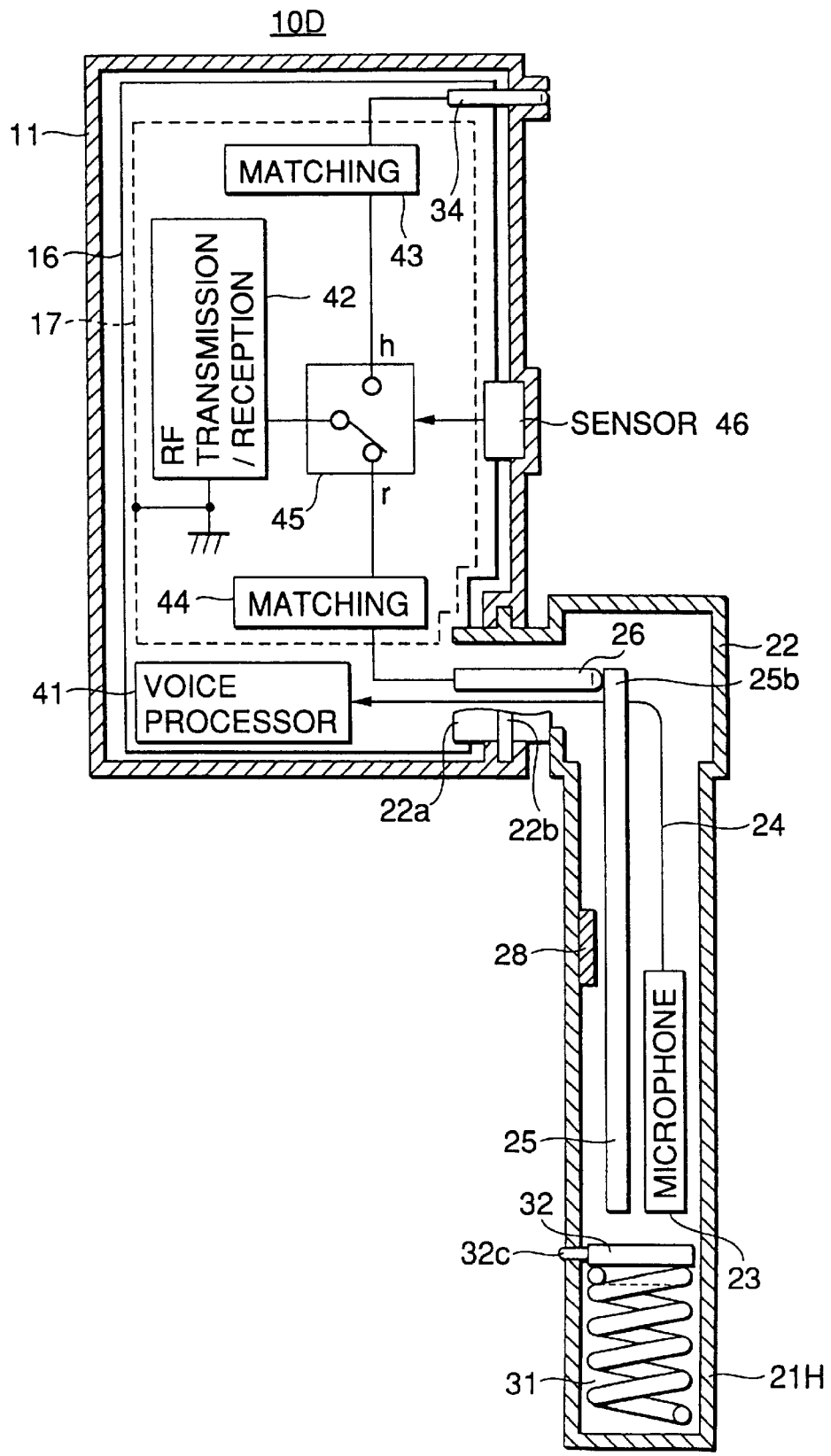
FIG. 7 is a conceptual diagram showing the specific construction of the main part of the fourth embodiment of the present invention.

The fourth embodiment according to the present invention is shown in FIGS. 6 and 7. In FIGS. 6 and 7, the portions corresponding to those of FIGS. 2 to 5 are represented by the same reference numerals, and the description of a part thereof is omitted. The basic construction of this embodiment is the same as FIG. 2.

In FIGS. 6 and 7, a compact portable telephone 10D is designed so that the rotational shaft 22a of the rotational end portion 22 of the microphone arm 21H formed of a suitable synthetic resin is held at the lower end portion of the right side of the housing 11 formed of a suitable synthetic resin so as to be freely rotatable in a predetermined angle range.

In the retraction state when the housing 11 and the microphone arm 21H are aligned with each other as shown in FIG. 6, the length of the microphone arm 21H is set so that the free end portion of the microphone arm 21H is projected from the upper end of the housing 11, end also the helical antenna 31 in which the conductor is spirally formed is contained in the free end portion of the microphone arm 21H.

The microphone 23 is located at a position nearer to the rotational end portion 22 than the helical antenna 31, and it is kept away from the speaker at the predetermined distance as described above in the state where the microphone arm 21H is drawn out as shown in FIG. 7.

In this embodiment, in addition to the above helical antenna 31, a rod antenna 25 formed of a linear conductor having a length of $\lambda/4$ to $\lambda/2$ is contained so as to extend from the intermediate portion of the microphone arm 21H to the rotational end portion 22, and a feeder spring 26 disposed in the rotational shaft 22a is brought into contact with the base portion 25b of the rod antenna 25.

The helical antenna 31 is coupled to the support fitting 32 at the base portion thereof, and a connection pin 32 (see FIG. 7) is disposed at the housing 11 side of the support fitting 32 so as to penetrate though the side walls of the microphone arm 21H. In addition, the feeding spring 34 is disposed at the upper end portion of the housing 11 so that it can be confronted to and brought into contact with the connection pin 32c.

The voice signal line 24 connected to the microphone 23 is passed through the inside of the rotational shaft 22a of the microphone arm 21H and guided into the housing 11, and then connected to the voice processing circuit 41 on the circuit board 16.

On the circuit board 16 are mounted an RF transmission/ reception circuit 42, first and second antenna matching circuits 43, 44, a change-over switch 45, etc. The RF transmission/reception circuit 42, the antenna matching circuits 43, 44 and the change-over switch 45 are disposed in the shield case 17.

The RF transmission/reception circuit 42 is connected to a movable contact point of the change-over switch 45. The first antenna matching circuit 43 is connected between an h-side fixed contact point of the switch 45 and the feeding spring 34, and the second antenna matching circuit 44 is connected between an r-side fixed contact point of the switch 45 and the feeding spring 26.

In this embodiment, a permanent magnet is contained in the microphone arm 21H, and a magnetic sensor 46 is disposed in the housing 11 so as to confront the magnet 28, whereby the connection of the change-over switch 45 is controlled in accordance with the output of the magnetic sensor 46 which corresponds to each of the retracted state and the drawn-out state of the microphone arm 21H.

The flange portion 22b is formed at the outside of the rotational shaft 22a of the microphone arm 21H integrally with the rotational shaft 22a in a predetermined angle range, and the rotational angle thereof is restricted in cooperation with a hook member (omitted from the illustration) of the housing 11 side when the microphone arm 21H is drawn out as shown in FIG. 7.

The microphone arm 21H is fixed at the positions indicated by the solid line and the chain line of FIG. 2 respectively by a suitable cam mechanism (omitted from the illustration). The protection plate 15) shown in FIG. 2 is also omitted from FIGS. 6 and 7.

[Operation of Fourth Embodiment]

Next, the operation of the fourth embodiment according to the present invention will be described.

At the carry-on state where a portable telephone 10D is on standby, as shown in FIG. 6, the microphone arm 21H is retracted while aligned with the right-side wall of the housing 11.

In this state, the connection pin 32c (see FIG. 7) of the support fitting 32 of the helical antenna 31 which is contained in the microphone arm 21H is brought into contact with the feeding spring 34 of the housing 11 side while confronts to the feeding spring 34, and the permanent magnet 28 in the microphone arm 21H and the magnetic sensor 46 are confronted to each other, so that the movable contact point of the change-over switch 45 is connected to the h-side fixed contact point on the basis of the output of the magnetic sensor 46.

Accordingly, the helical antenna 31 and the RF transmission/reception circuit 42 are connected to each other through the support fitting 32, the feeding spring 34, the antenna matching circuit 43 and the change-over switch 45, and the base portion 25b of the rod antenna 25 is connected to the r-side fixed contact point of the switch 45 through the feeding spring 26 and the antenna matching circuit 44, whereby the base portion 25b is separated from the RF transmission/reception circuit 42.

The helical antenna 31 is not approximate to the ground conductor (omitted from the illustration) and the shield case of the circuit board 16 over the entire length thereof, so that the input impedance is not increased, and thus the helical antenna 31 normally operates in a more stable matched state as a monopole antenna with the ground conductor and the shield case 17 acting a., the ground.

At this time, the rod antenna 25 does not function as the antenna.

At the telephone call of the portable telephone 10D, as indicated by the chain line of FIG. 2, the microphone arm 21H is rotated in the counterclockwise direction from the retraction state as described above, ani drawn out so that the microphone 23 and the housing 11 are intersected to each other at a suitable obtuse angle, so that the microphone 23 and the speaker are kept away from each other at a predetermined distance.

In this state, as shown in FIG. 7, the connection pin 32c of the support fitting 32 of the helical antenna 31 contained in the microphone arm 21H is separated from the feeding spring 34 of the housing 11 side, and also separated from the permanent magnet 28 in the microphone arm 21H and the magnetic sensor 46 in the housing 11, so that the movable contact point of the change-over switch 45 is switched to the r-side fixed contact point on the basis of the output of the magnetic sensor 46.

Accordingly, the rod antenna 25 and the RF transmission/reception circuit 42 are connected to each other through the feeding spring 26, the antenna matching circuit 44 and the change-over switch 45, and the helical antenna 31 is connected to the h-side fixed contact point of the switch 45 through the support fitting 32, the feeding spring 34 and the antenna matching circuit 43 and separated from the RF transmission/reception circuit 42.

The rod antenna 25 is not approximate to the ground conductor (omitted from the illustration) and the shield case 17 of the circuit board 16 over the entire length thereof. Therefore, the input impedance is not increased and the rod antenna 25 normally operates in a more stable matched state as a monopole antenna with the ground conductor and the shield case of the circuit board 16 acting as the ground.

At this time, the helical antenna 31 does not function as the antenna.

In the above-described embodiment, when the microphone arm 21H is retracted, the helical antenna 31 contained in the free end portion so as to be projected upwardly from the upper end of the housing 11 is made to function, and when the microphone arm 21H is drawn out, the switch 45 is switched so that the rod antenna 25 contained in the intermediate portion thereof functions. Therefore, in any cases where the microphone arm 21H is retracted and where the microphone arm 21H is drawn out, the effect on the input impedance of the helical antenna 31 or the rod antenna 25 by the ground conductor and the shield case 17 of the circuit board 16 contained in the housing 11 is suppressed, and thus the excellent antenna characteristics can be obtained.

[Construction of Fifth Embodiment]

Next, the fifth embodiment of the antenna apparatus according to the present invention will be described with reference to FIGS. 8 and 9.

The construction of the fifth embodiment according to the present invention will be described. The portions corresponding to those of FIGS. 6 and 7 are represented by the same reference numerals, and the description of a part thereof is omitted.

Figure 8:
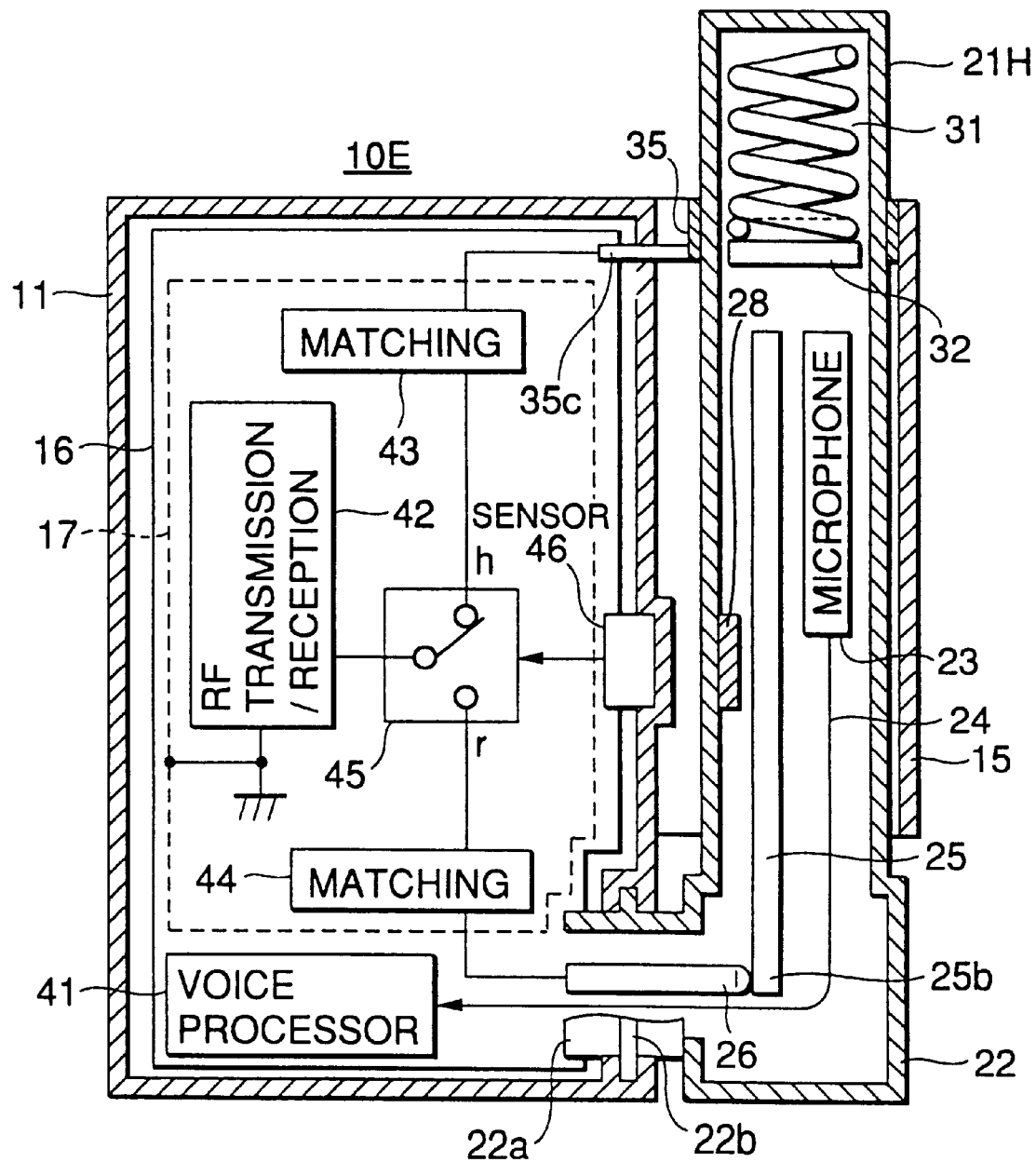
FIG. 8 is a conceptual diagram showing the specific construction of the main part of the fifth embodiment of the present invention.
Figure 9:
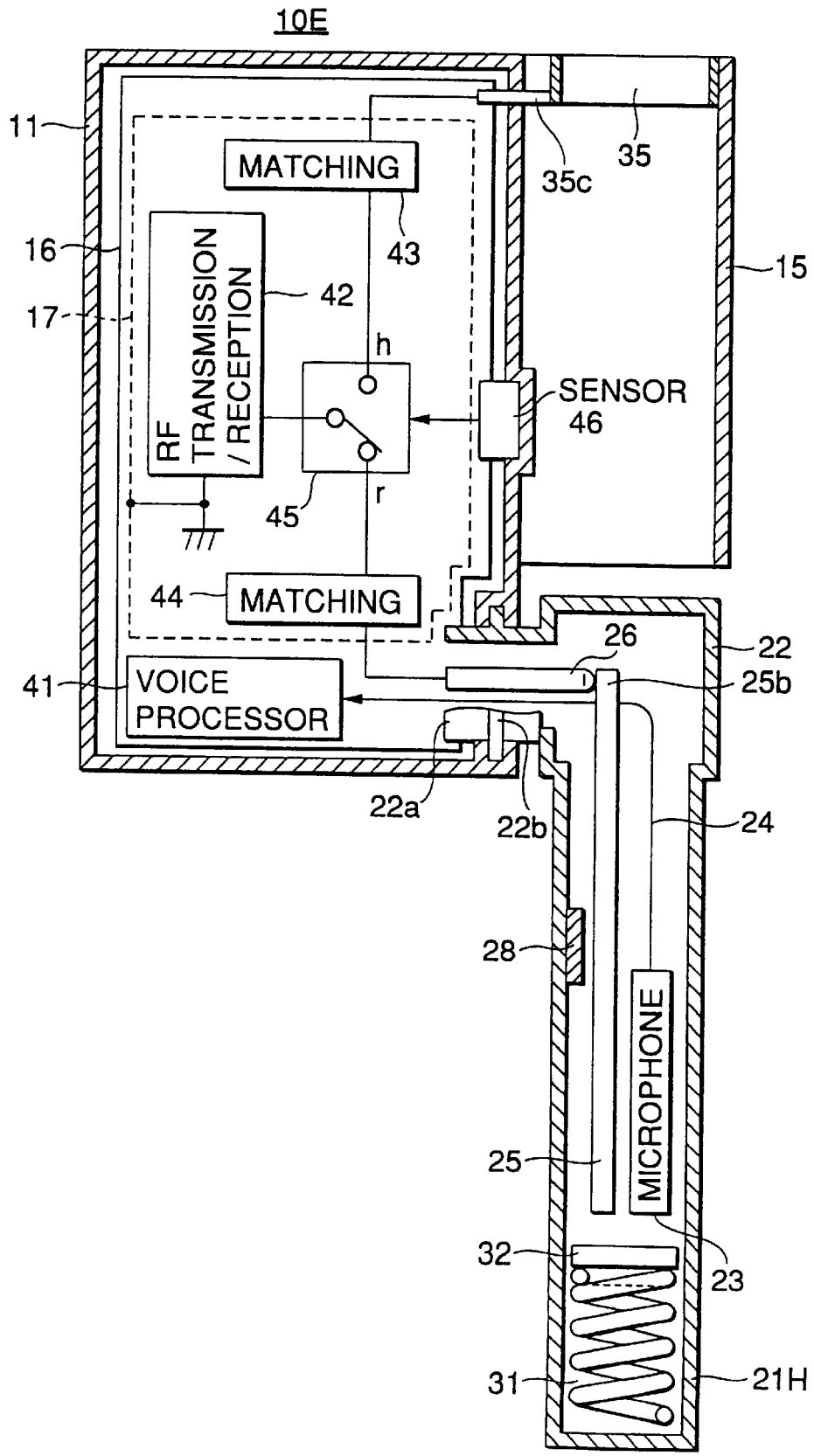
FIG. 9 is a conceptual diagram showing the specific construction of the main part of the fifth embodiment of the present invention.

In FIGS. 8 and 9, a compact portable telephone 10E is designed so that the rotational shaft 22a of the rotational end portion 22 of the microphone arm 21H formed of a suitable synthetic resin material is held at the lower end portion of the right side of the housing 11 formed of a suitable synthetic resin material so as to be freely rotatable in a predetermined angle range.

As shown in FIG. 8, in the state where the microphone arm 21H is aligned with the housing 11 and retracted between the side wall thereof and the protection plate 15, the length of the microphone arm 21H is set so that the free end portion of the microphone arm 21H is upwardly projected from the upper end of the housing 11 in the figure, and the helical antenna 31 in which the conductor is spirally formed is contained in the free end portion of the microphone arm 21H while the base portion thereof is coupled to the support fitting 32.

The microphone 23 is disposed at a position nearer to the rotational end portion 22 than the helical antenna 31, and it is kept away from the speaker at the predetermined distance as described above in the state where the microphone arm 21H is drawn out as shown in FIG. 9.

The rod antenna 25 which has a length of $\lambda/4$ to $\lambda/2$ and formed of a linear conductor is contained so as to extend from the intermediate portion of the microphone arm 21H to the rotational end portion 22, and the feeding spring 26 which is disposed in the rotational shaft 22a of the base portion 25b is brought into contact with the base portion 25b while confronted to the base portion 25b.

In this embodiment, the feeding of the helical antenna 31 is performed by an electromagnetic coupling element 35 in place of the feeding spring 34 of the embodiment as described above.

The electromagnetic coupling element 35 is formed of a semi-circular conductor, and it is disposed between the side wall of the housing 11 and the protection plate 15 while is coaxially confronted to (the base port-ion of) the helical antenna 31 in the state where the microphone arm 21H is retracted as shown in FIG. 8. The connection pin 35c of the electromagnetic coupling element 35 is disposed so as to penetrate through the side wall of the housing 11.

The voice signal line 24 connected to the microphone 23 is passed through the inside of the rotational shaft 22a of the microphone arm 21H, guided into the housing 11 and connected to the voice processing circuit 41 on the circuit board 16.

On the circuit board 16 are mounted the first and second antenna matching circuits 43, 44, the changeover switch 45, etc. The RF transmission/reception circuit 42, the antenna matching circuits 43, 44 and the changeover switch 45 are disposed in the shield case 17.

The RF transmission/reception circuit 42 is connected to the movable contact point of the change-over switch 45, and the first antenna matching circuit 43 is connected between the h-side fixed contact point of the switch 45 and the connection pin 35c of the electromagnetic coupling element 35. In addition, the second antenna matching circuit 44 is connected between the r-side fixed contact point of the switch 45 and the feeding spring 26.

The magnetic sensor 46 for controlling the connection of the changeover switch 45 is disposed in the housing 11, and the permanent magnet 28 is contained in the microphone arm 21H so as to confront the magnetic sensor 46.

The flange portion 22b is formed at the outside of the rotational shaft 22a of the microphone arm 21H integrally with the rotational shaft 22a in a predetermined angle range, and the rotational angle thereof is restricted in cooperation with a hook member (omitted from the illustration) of the housing 11 side when the microphone arm 21H is drawn out as shown in FIG. 9.

The microphone arm 21H is fixed at the positions indicated by the solid line and the chain line of FIG. 2 by a suitable cam mechanism (omitted from this illustration).

[Operation of Fifth Embodiment]

Next, the operation of the fifth embodiment according to the present invention will be described.

At the carry-on state where the portable telephone 10E is on standby, as shown in FIG. 8, the microphone arm 21H is aligned with the housing 11, and retracted between the right-side wall and the protection plate 15.

In this state, the helical antenna 31 contained in the microphone arm 21H and the electromagnetic coupling element 35 of the housing 11 side are confronted to each other, and the permanent magnet 28 in the microphone arm 21H and the magnetic sensor 46 in the housing 11 are confronted to each other, so that the movable contact point of the change-over switch 45 is connected to the h-side fixed contact point on the basis of the output of the magnetic sensor 46. Accordingly, the RF transmission/reception circuit 42 and the magnetic coupling element 35 are connected to each other through the antenna matching circuit 43 and the change-over switch 45, and high-frequency current flows into the electromagnetic coupling element 35 so that the magnetic flux corresponding to the current interlinks the helical antenna 31, whereby the high-frequency current flows into the helical antenna 31.

At this time, the rod antenna 25 is connected to the r-side fixed contact point of the switch 45 through the feeding spring 26 and the antenna matching circuit 44 and separated from the RF transmission/reception circuit 42, so that it does not function as an antenna.

Since the helical antenna 31 is not approximate to the ground conductor (omitted from the illustration) and the shield case 17 of the circuit board 16 over the entire length thereof, the input impedance is not increased. Therefore, it normally operates in a more stable matched state as a monopole with the ground conductor and the shield case 17 of the circuit board 16 acting as the ground.

At the telephone call time of the portable telephone 10E, as indicated by the chain line of FIG. 2, the microphone arm 21H is rotated in the counterclockwise direction from the retraction state as described above, and drawn out so that the microphone 23 and the housing 11 are intersected to each other at a suitable obtuse angle, whereby the microphone 23 and the speaker are kept away from each other at a predetermined distance.

In this state, as shown in FIG. 9, the helical antenna 31 contained in the microphone arm 21H and the electromagnetic coupling element 35 of the housing 11 side are separated from each other, and the permanent magnet 28 in the microphone arm 21H and the magnetic sensor 46 in the housing 11 are separated from each other, so that the movable contact point of the change-over switch 45 is switched to the r-side fixed contact point on the basis of the output of the magnetic sensor 46.

Accordingly, the rod antenna 25 and the RF transmission/reception circuit 42 are connected to each other through the feeding spring 26, the antenna matching circuit 44 and the change-over switch 15, and the helical antenna 31 is connected to the h-side fixed contact point of the switch 45 through the antenna matching circuit 43 and separated from the RF transmission/reception circuit 42.

The rod antenna 25 is not approximate to the ground conductor (omitted from the illustration) and the shield case 17 of the circuit board 16 over the entire length thereof, so that the input impedance is not increased and thus the rod antenna 25 normally operates in a more stable matched state as a monopole antenna with the ground conductor and the shield case 17 of the circuit board 16 acting as the ground.

At this time, the helical antenna 31 does not function as an antenna.

In the above-described embodiment, when the microphone arm 21H is retracted, the helical antenna 31 which is contained in the free end portion of thus microphone arm 21H so as to be upwardly projected form the upper end of the housing 11 is made to function, and when the microphone arm 21H is drawn out, the switch 45 is switched so that the rod antenna 25 contained in the intermediate portion of the microphone arm 21H functions. Therefore, in any cases where the microphone arm 21H is retracted and where it is drawn out, the effect on the input impedance of the helical antenna 31 or the rod antenna 25 by the ground conductor and the shield case 17 of the circuit board 16 contained in the housing 11 is suppressed, and thus the excellent characteristics can be obtained.

[Construction of Sixth Embodiment]

Next, the sixth embodiment of the antenna apparatus according to the present invention will be described with reference to FIGS. 10 and 11.

Figure 10:
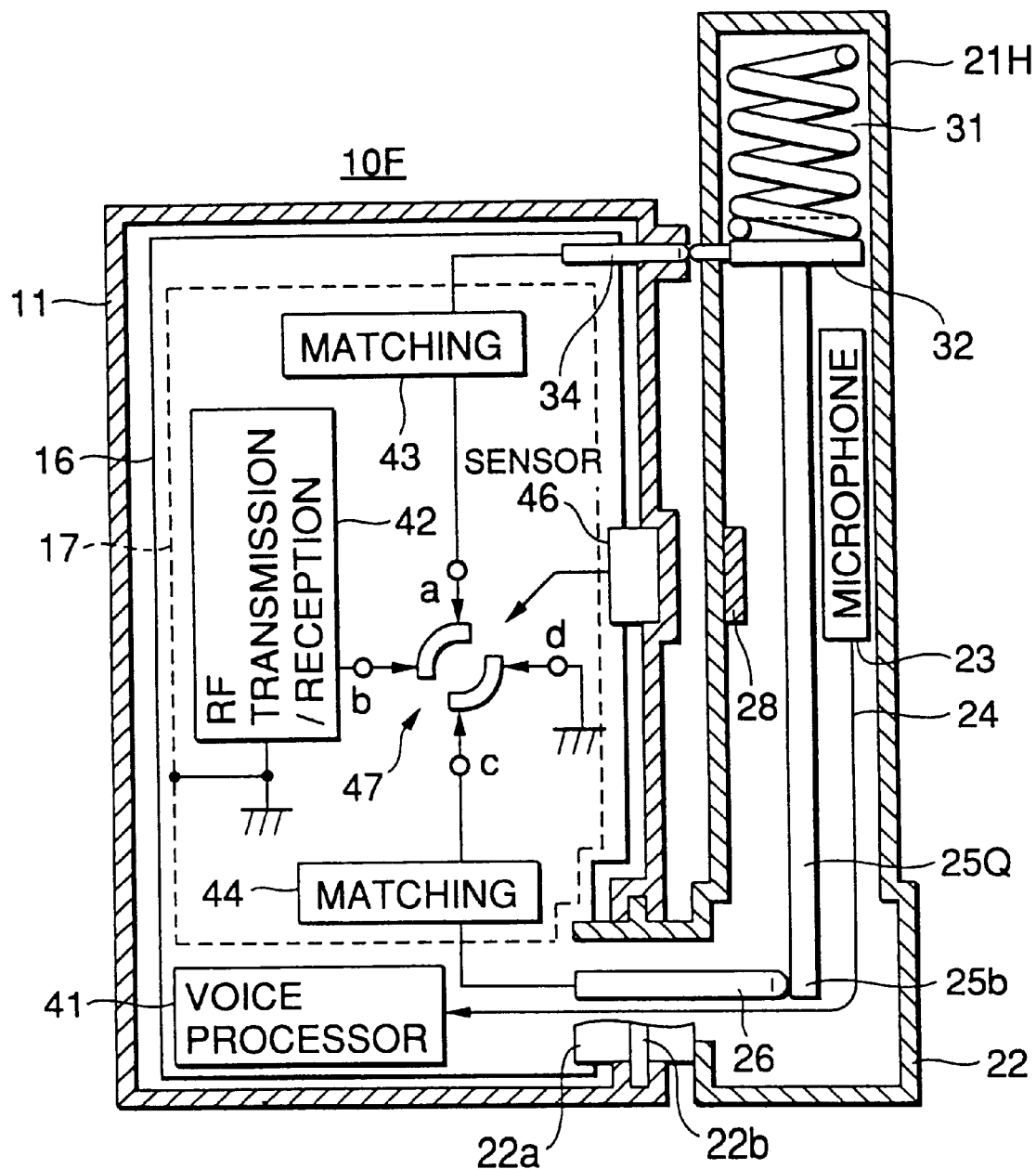
FIG. 10 is a conceptual diagram showing the specific construction of the main part of the sixth embodiment of the present invention.
Figure 11:
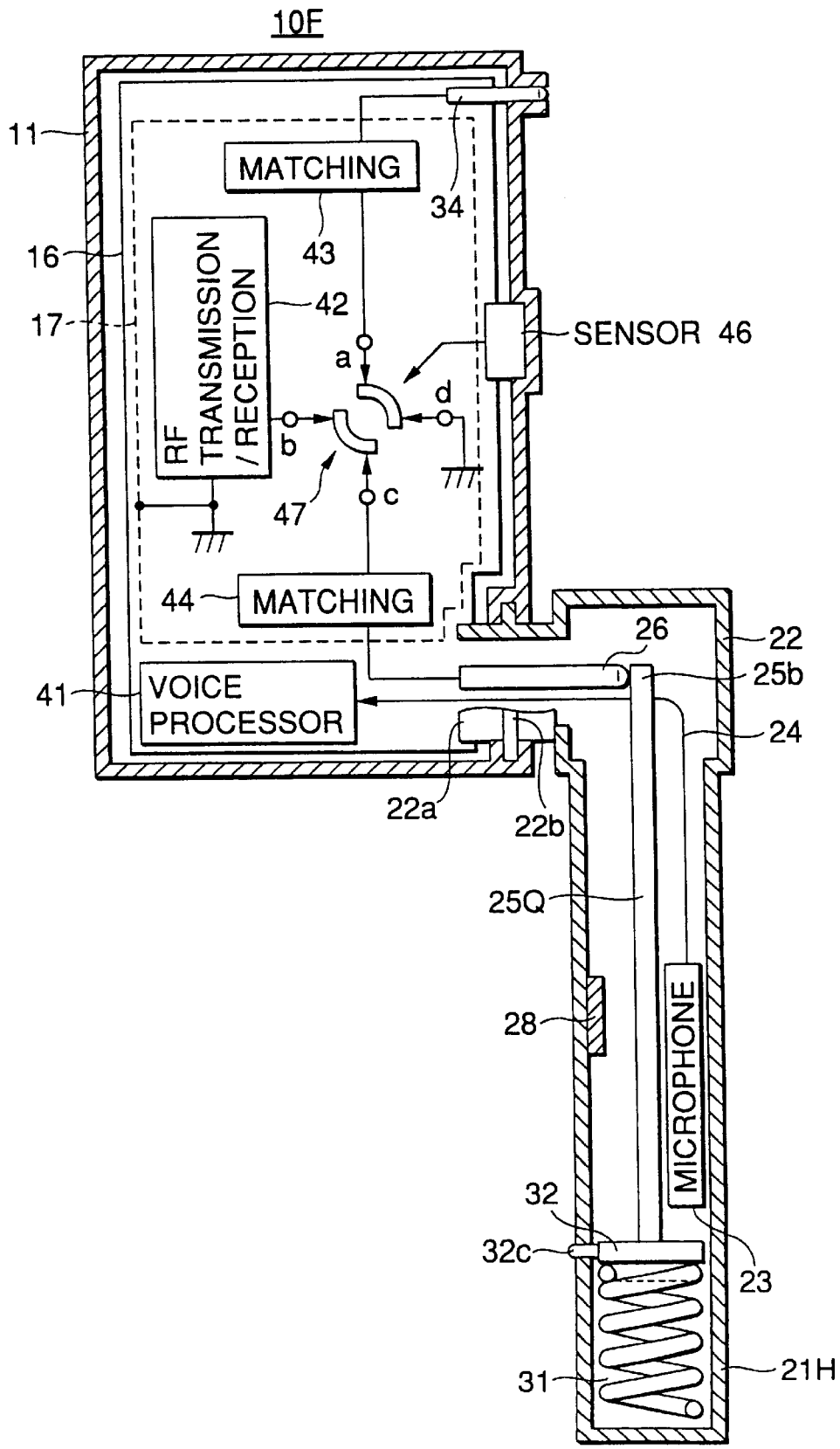
FIG. 11 is a conceptual diagram showing the specific construction of the main part of the sixth embodiment of the present invention.

The construction of the sixth embodiment of the present invention is shown in FIGS. 10 and 11. In FIGS. 10 and 11, the portions corresponding to those of FIGS. 6 to 9 are represented by the same reference numerals, and the description of a part thereof is omitted.

In FIGS. 10 and 11, a compact portable telephone 10F is designed so that the rotational shaft 22a of the rotational end portion 22 of the microphone arm 21H formed of a suitable synthetic resin material is held at the lower end portion of the right side of the housing 11 formed of a suitable synthetic resin so as to be freely rotatable in a predetermined angle range.

As shown in FIG. 10, the length of the microphone arm 21H is set so that the free end portion of the microphone arm 21H is upwardly projected from the upper end of the housing 11 in the figure when the housing 11 and the microphone arm 21H are aligned with each other, and the helical antenna 31 in which the conductor is spirally formed is contained in the free end portion while the base portion thereof is coupled to the support fitting 32.

The microphone 23 is disposed at it position nearer to the rotational end portion 22 than the helical antenna 31, and it is kept away from the speaker at the predetermined distance as described above in the state where the microphone arm 21H is drawn out as shown in FIG. 11.

In this embodiment, one end of a rod antenna 25Q which has a length of λ/4 and is formed of a linear conductor is directly connected to the support fitting 32 of the helical antenna 31 in the microphone arm 21H, and the feeding spring 26 disposed in the rotational shaft 22a is confronted to and brought into contact with the base portion 25b of the rod antenna 25Q.

Further, the connection pin 32c (see FIG. 11) is disposed at the housing 11 side of the support fitting 32 of the helical antenna 31 so as to penetrate through the side wall of the microphone arm 21H, and the Feeding spring 34 is disposed at the upper end portion of the housing 11 so that the feeding spring 34 confronts the connection pin 32c in contact with the connection pin 32c.

The voice signal line 24 connected to the microphone 23 is passed through the inside of the rotational shaft 22a of the microphone arm 21H to be guided into the housing 11 and connected to the voice processing circuit 41 on the circuit board 16.

On the circuit board 16 are mounted the RF transmission/reception circuit 42, the first and second antenna matching circuits 43, 44, a two-circuits change-over switch 47, etc. The RF transmission/reception circuit 42, the antenna matching circuits 43, 44 and the changeover switch 47 are disposed in the shield casks 17.

The first antenna matching circuit 43 is connected between the a contact point of the two-circuits change-over switch 47 and the feeding spring 34, and the RF transmission/reception circuit 42 is connected to the b contact point of the switch 47. In addition, the second antenna matching circuit 44 is connected between the c contact point of the switch 47 and the feeding spring 26. The contact point of the switch 47 is grounded.

A magnetic sensor 46 for controlling the connection of the two-circuits change-over switch 47 is disposed in the housing 11, and also the permanent magnet 28 is contained in the microphone arm 21H so as to confront the magnetic sensor 46.

The flange portion 22b is formed integrally with the rotational shaft 22a of the microphone arm 21H at the outside of the rotational shaft 22a in a predetermined angle range, and the rotational angle thereof is restricted in cooperation with a hook member (omitted from the illustration) of the housing 11 side when the microphone arm 21H is drawn out as shown in FIG. 11.

The microphone arm 21H is fixed cat the positions as indicated by the solid line and the chain line of FIG. 2 by a suitable cam mechanism (omitted from the illustration).

The protection plate 15 shown in FIG. 2 is also omitted from FIGS. 10 and 11.

[Operation of Sixth Embodiment]

Next, the operation of the sixth embodiment according to the present invention will be described.

At the carry-on state where a portable telephone 20F is on standby, as shown in FIG. 10, the microphone arm 21H is retracted while aligned with the right-side wall of the housing 11.

In this retraction state, the connection pin 32c (see FIG. 11) of the support fitting 32 of the helical antenna 31 contained in the microphone arm 21H confronts the feeding spring 34 of the housing 11 side in contact with the feeding spring 34, and the permanent magnet 28 and the magnetic sensor 46 in the housing 11 are confronted to each other, so that the a, b contact points of the switch 47 of the housing 11 and the c, d contact points are connected to each other.

Accordingly, the helical antenna 31 and the RF transmission/reception circuit 42 are connected to each other through the support fitting 32, the feeding spring 34, the antenna matching circuit 43 and the a, b contact points of the change-over switch 47, and the base portion 25b of the rod antenna 25Q of λ/4 is grounded through the feeding spring 26, the antenna matching circuit 44 and the c, d contact points of the switch 47.

Accordingly, the impedance of the X/4 rod antenna 25Q which is viewed from the support fitting 32 side of the helical antenna 31 is increased, and thus high frequency current which is supplied through the feeding spring 34 does not flow therein, so that the λ/4 rod antenna 25Q does not function as the antenna.

On the other hand, the helical antenna 31 is not approximate to the ground conductor (omitted from the illustration) and the shield case 17 of the circuit board 16 over the entire length thereof, and thus the input impedance is not increased and the high frequency current is supplied through the feeding spring 34, so that the helical antenna 31 normally operates in a more stable matched state as a monopole antenna with the ground conductor and the shield case 17 of the circuit board 16 acting as; the ground.

Further, during the telephone call of the portable telephone 10F, as indicated by the chain line of FIG. 2, the microphone arm 21H is rotated in the counterclockwise direction from the retraction state as described above, and drawn out so that the microphone 23 and the housing 11 are intersected to each other at a suitable obtuse angle, whereby the microphone 23 and the speaker are kept away from each other at a predetermined distance. In this state, as shown in FIG. 11, the connection pin 32c of the support fitting 32 of the helical antenna 31 which is contained in the microphone arm 21H and the feeding spring 34 of the housing 11 side are separated from each other, and the permanent magnet 28 in the microphone arm 21H and the magnetic sensor 46 in the housing 11 are separated from each other, so that the a, b contact points and the b, c contact points of the two-circuits change-over switch 47 are connected to each other on the basis of the output of the magnetic sensor 46.

Accordingly, the helical antenna 31 and the RF transmission/reception circuit 42 are connected to each other through the support fitting 32, the λ/4 rod antenna 25Q, the feeding spring 26, the antenna matching circuit 44 and the b, c contact points of the change-over switch 47, and also the feeding spring 34 is grounded through the antenna matching circuit 43 and the a, d contact points of the change-over switch 47.

The helical antenna 31 and the λ/4 rod antenna 25Q form one antenna system, and the ground conductor (omitted from the illustration) and the shield case 17 of the circuit board 16 are not approximate to them over the entire length thereof. Therefore, the input impedance is not increased and they normally operate in a more stable matched state as a so-called top loading type antenna with the ground conductor and the shield case 17 of the circuit board 16 acting as the ground.

In the above-described embodiment, when the microphone arm 21H is retracted, the helical antenna 31 which is contained in the free end portion thereof so as to be upwardly projected from the upper end of the housing 11 is made to function, and the switch 47 is switched so that the helical antenna 31 and the λ/4 road antenna 25Q function as one antenna system when the microphone arm 21H is drawn out. Therefore, in any cases where the microphone arm 21H is retracted and where it is drawn out, the Effect on the input impedance by the ground conductor and the shield case 17 of the circuit board 16 contained in the housing 11 is suppressed, and thus the excellent antenna characteristics can be obtained.

[Construction of Seventh Embodiment]

Next, the seventh embodiment of the(antenna apparatus according to the present invention will be described with reference to FIGS. 12 and 13.

Figure 12:
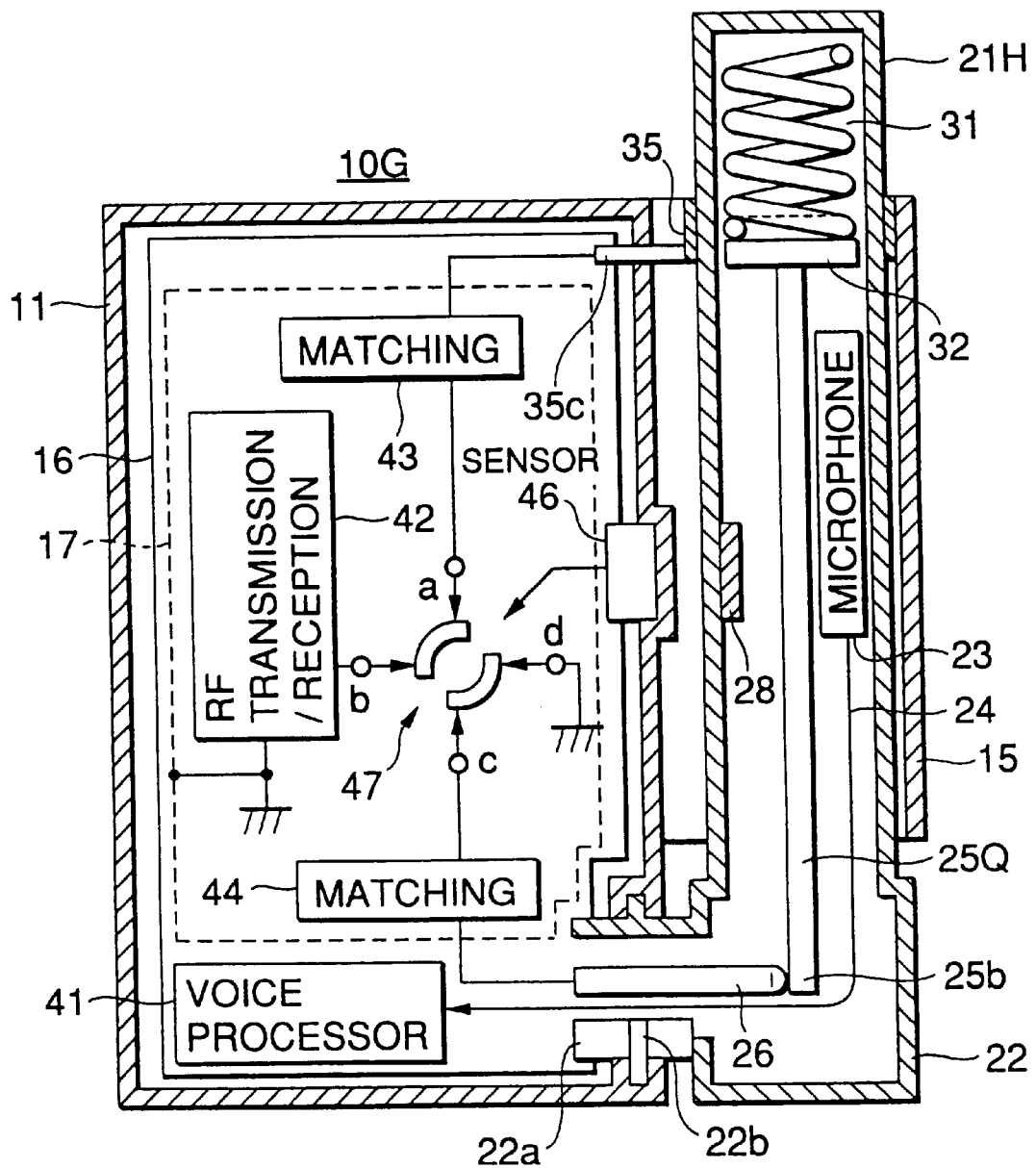
FIG. 12 is a conceptual diagram showing the specific construction of the main part of the seventh embodiment of the present invention.
Figure 13:
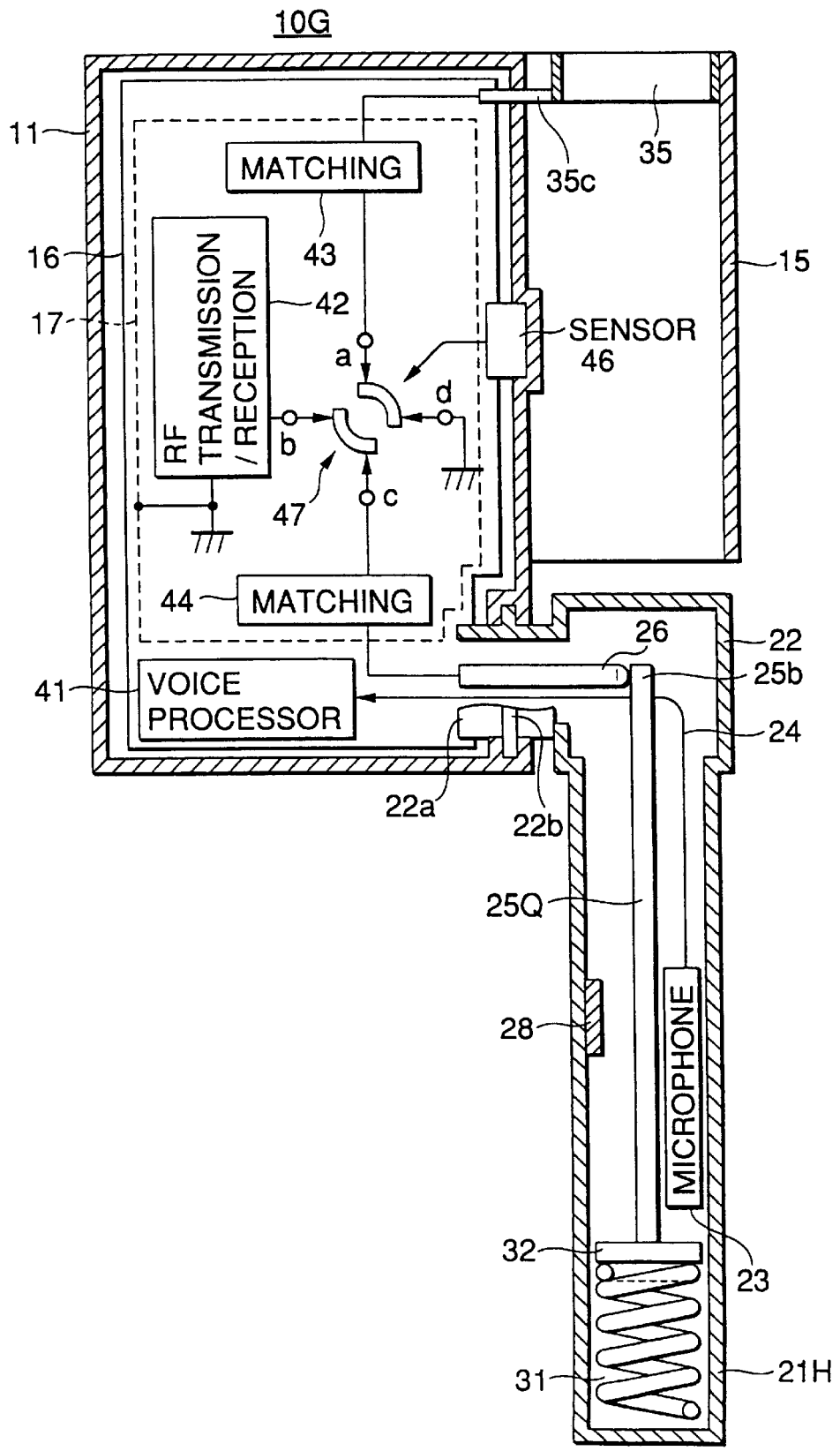
FIG. 13 is a conceptual diagram showing the specific construction of the main part of the seventh embodiment of the present invention.

The construction of the seventh embodiment is shown in FIGS. 12 and 13. In FIGS. 12 and 13, the portions corresponding to those of FIGS. 6 to 11 are represented by the same reference numerals, and the description of a part thereof is omitted.

In FIGS. 12 and 13, a compact telephone 10G is designed so that the rotational shaft 22a of the rotational end portion 22 of the microphone arm 21H formed of a suitable synthetic resin material is held at the lower end portion of the right side of the housing 11 formed of a suitable synthetic resin material so as to be freely rotatable in a predetermined angle range.

As shown in FIG. 12, the length cf the microphone arm 21H is set so that the free end portion of the microphone arm 21H is upwardly projected from th(e upper end of the housing 11 in the figure in the state where the microphone arm 21H is aligned with the housing 11 aid retracted between the side wall of the housing 11 and the protection plate 15, and the helical antenna 31 in which the conductor is spirally formed is contained in the free end portion while the base portion thereof is coupled to the support fitting 32.

The microphone 23 is disposed at a position nearer to the rotational end portion 22 than the helical antenna 31, and it is kept away from the speaker at the predetermined distance as described when the microphone arm 21H is drawn out as shown in FIG. 13.

In this embodiment, one end of the rod antenna 25Q which has a length of λ/4 and is formed of a linear conductor is connected to the support fitting 32 of the helical antenna 31 in the microphone arm 21H, and the feeding spring 26 disposed in the rotational shaft 22a is confronted to and brought into contact with the base portion 25b of the rod antenna 25Q.

In this embodiment, the feeding tc the helical antenna 31 is performed through an electromagnetic coupling element 35 which is formed of a semi-circular conductor.

The electromagnetic coupling element 35 is disposed between the side wall of the housing 11 and the protection plate 15 so as to be coaxially confronted to (the base portion of) the helical antenna 31 in the state where the microphone arm 21H is retracted as shown in FIG. 12, and the connection pin 35c of the electromagnetic coupling element 35 is disposed so as to penetrate through the side wall of the housing 11.

The voice signal line 24 connected to the microphone 23 is passed through the inside of the rotational shaft 22a of the microphone arm 21H, guided into the housing 11, and connected to the voice processing circuit 41 on the circuit board 16.

On the circuit board 16 are mounted the RF transmission/reception circuit 42, the first and second antenna matching circuits 43, 44 and the two-circuit changeover switch 47. The RF transmission/reception circuit 42, the antenna matching circuits 43, 44 and the changeover switch 47 are disposed in the shield case 17.

The first antenna matching circuit 43 is connected between the a contact point of the two-circuits change-over switch 47 and the connection pin 35c of the electromagnetic coupling element 35, and the RF transmission/reception circuit 42 is connected to the b contact point of the switch 47. In addition, the second antenna matching circuit 44 is connected between the c contact point of the switch 47 and the feeding spring 26. The d contact point of the switch 47 is grounded.

The magnetic sensor 46 is disposed in the housing 11 to control the connection of the two-circuits change-over switch 47, and the permanent magnet 28 is contained in the microphone arm 21H so as to confront the magnetic sensor 46.

The flange portion 22b is formed integrally with the rotational shaft 22a of the microphone arm 21H at the outside thereof in a predetermined angle range, and the rotational angle is restricted in cooperation with a hook member (omitted from the illustration) of the housing 11 side when the microphone arm 21H is drawn out as shown in FIG. 13.

The microphone arm 21H is fixed at the positions as indicated by the solid line and the chain line of FIG. 2 respectively by a suitable cam mechanism (omitted from the illustration).

[Operation of Seventh Embodiment]

Next, the operation of the seventh embodiment according to the present invention will be described.

At the carry-on state where a portable telephone 10G is on standby, as shown in FIG. 12, the microphone arm 21H is aligned with the housing 11, and refracted between the right-side wall and the protection plate 15.

In this state, the helical antenna 31 contained in the microphone arm 21H and the electromagnetic coupling element 35 of the housing 11 side are confronted to each other, and permanent magnet 28 in the microphone arm 21H and the magnetic sensor 46 in the housing 11 are confronted to each other, whereby the a, b contact points anti the c, d contact points of the two-circuits change-over switch 47 are connected to each other on the basis of the output of the magnetic sensor 46.

Accordingly, the RF transmission/reception circuit 42 and the electromagnetic coupling element 35 are connected to each other through the antenna matching circuit 43 and the a, b contact points of the change-over switch 47, and the base portion 25b of the λ/4 rod antenna 25Q is grounded through the feeding spring 26, the antenna matching circuit 44 and the c, d contact points of the switch 47.

Accordingly, the helical antenna 31 interlinks the magnetic flux corresponding to the high-frequency current flowing into the electromagnetic coupling element 35 so that it is supplied with high-frequency current.

On the other hand, the impedance of the λ/4 rod antenna 25Q which is viewed from the support fitting 32 side of the helical antenna 31 is increased, and the high frequency current which is supplied through the feeding spring 34 does not flow into the λ/4 rod antenna 25Q, so that the λ/4 rod antenna 25Q does not function as an antenna.

The helical antenna 31 is not approximate to the ground conductor (omitted from the illustration) and the shield case 17 of the circuit board 16 over the entire length thereof, and thus the input impedance is not increased, so that it normally operates in a more stable matched state as a monopole antenna with the ground conductor and the shield case 17 of the circuit board 16 acting as the ground.

During the telephone call of the portable telephone 10E, as indicated by the chain line of FIG. 2, the microphone arm 21H is rotated in the counterclockwise direction from the retraction state as described above and drawn out so that the microphone 23 and the housing 11 are intersected to each other at a suitable obtuse angle, whereby the microphone 23 and the speaker are kept from each other at a predetermined distance.

In this state, as shown in FIG. 13, the helical antenna 31 contained in the microphone arm 21H is separated from the electromagnetic coupling element 35 of the housing 11 side, and the permanent magnet 28 in the microphone arm 21H and the magnetic sensor 46 in the housing 11 are separated from each other, so that the a, d contact points and the b, c contact points of the two-circuits change-over switch 47 are connected to each other on the basis of the output of the magnetic sensor 45. Accordingly, the helical antenna 31 and the RF transmission/reception circuit 42 are connected to each other through the support fitting 32, the λ/4 rod antenna 25Q, the feeding spring 26, the antenna matching circuit 44 and the b, c contact points of the change-over switch 47, and the feeding spring 34 is grounded through the antenna matching circuit 43 and the a, d contact points of the change-over switch 47.

The helical antenna 31 and the λ/4 rod antenna 25Q form one antenna system, and it is not approximate to the ground conductor (omitted from the illustration) and the shield case 17 of the circuit board 16 over the entire length thereof, so that the input impedance is not increased, and thus it normally operates in a more stable matched state as a so-called top loading type composite antenna with the ground conductor and the shield case 17 of the circuit board 16 acting as the ground.

In the above-described embodiment, when the microphone arm 21H is retracted, the helical antenna 31 which is contained in the free end portion so as to be upwardly projected from the upper end of the housing 11 is made to function, and when the microphone arm 21H is drawn out, the switch 47 is switched so that the helical antenna 31 and the λ/4 rod antenna 25Q function as one antenna system. Therefore, in any cases where the microphone arm 21H is retracted and where it is drawn out, the effect on the input impedance by the ground conductor and the shield case 17 of the circuit board 16 contained in the housing 11 is suppressed, and the excellent antenna characteristics can be obtained.

[Other Embodiments]

In both embodiments as shown in FIGS. 10 and 11, and FIGS. 12 and 13, the length of the rod antenna is set to λ/4. However, when the microphone arm is retracted, the length of the rod antenna can be set to λ/2 by opening the d contact point of the two-circuits change-over switch 47.

In each of the embodiments shown iii FIGS. 6 to 13, the changeover switch or the two-circuit changeover switch is switched on the basis of the output of the magnetic sensor. However, each switch may be set so as to be mechanically interlocked with the microphone arm.

Further, each of the above-described embodiments is directed to the case where the support fitting of the helical antenna, the outer sheath conductor for Sperre top and the electromagnetic coupling element are formed of metal materials. However, they may be formed of predetermined conductive materials.

Each of the above-described embodiments is directed to the case where the transmission/reception circuit is used. However, when the antenna is used for only transmission or only reception, only a transmission circuit or only a reception circuit is connected to the antenna.

Further, each of the above-described embodiments is directed to the case where the housing and the microphone arm are formed of synthetic resin materials. However, by using a suitable spacer, the housing and The microphone arm may be formed of metal materials.

Still further, each of the above-described embodiments is directed to the case where the rod antenna is merely formed of a linear conductor. However, the rod antenna may be formed of an elastic conductor, a conductor around which a spring material is tightly wound, or a small-diameter conductor which is formed spirally to prevent the antenna from being broken.

As described above, according to the present invention, in any of the retraction stages and the drawn-out states of the microphone arm which is freely rotatably coupled to one end portion of the housing of the main body of the radio apparatus and in which the microphone and the antenna conductor are contained, excellent antenna characteristics are obtained.

What is claimed is:

1. A portable radio apparatus comprising:
   a cylindrical body containing an antenna;
   a microphone that is freely rotatably coupled to a side portion of a housing of a body of the radio apparatus at one end portion in a central axis direction thereof, and which is used both in a first state where the housing and the cylindrical body are aligned, and in a second state where the housing and the cylindrical body are intersected to each other at a predetermined angle, characterized in that the other end portion of the cylindrical body in the center axis direction is projected outwardly from an end edge of the housing in the first state, and the antenna is embedded into the other portion of the cylindrical body in the center axis direction, wherein the antenna is arranged in a spiral form; and
   a coaxial feeder connected to the antenna and having an outer sheath conductor connected to an outer conductor of the coaxial feeder.

2. The portable radio apparatus as claimed in claim 1, further comprising a ground plate embedded in the cylindrical body, wherein the ground plate is provided with matching means for matching the antenna and the feeder.

3. The portable radio apparatus as claimed in claim 1, further comprising a second antenna embedded in the one end side of the cylindrical body in the center axis direction, and selective feeding means for selectively feeding to the first and the second antennas.

4. The portable radio apparatus as claimed in claim 3, wherein the first antenna is arranged in a spiral form, and the second antenna is designed in a linear form.

5. The portable radio apparatus as claimed in claim 3, wherein the first antenna is arranged in a spiral form, and the second antenna is designed in a linear form, and one end of the second antenna is connected to a base portion of the first antenna.

6. The portable radio apparatus as claimed in claim 3, wherein the selective feeding means contains an electromagnetic coupling element which confronts the first antenna.

7. A portable radio apparatus comprising a housing;

an antenna apparatus which includes an antenna conductor contained in a cylindrical body together with a microphone, the cylindrical body being freely rotatably coupled to a side portion of the housing and is used both in a first, state where the housing and the cylindrical body are intersected to each other at a predetermined angle, characterized in that an end portion of the cylindrical body at an opposite end to a rotational shaft side in the center axis direction is projected outwardly from an end edge of the housing in the first state, and the antenna conductor is embedded in the other end portion which is projected from the housing, wherein the antenna conductor is arranged in a spiral form; and a coaxial feeder connected to the antenna conductor and having an outer sheath conductor connected to an outer conductor of the coaxial feeder.

8. The antenna apparatus as claimed in claim 7, further comprising a ground plate embedded in the cylindrical body, wherein the ground plate is provided with matching means for matching the antenna conductor and the feeder.

9. The antenna apparatus as claimed in claim 7, wherein the antenna conductor comprises a first antenna conductor embedded in the other end portion which is projected, and further comprising a second antenna conductor embedded at the rotational shaft side of the cylindrical body, wherein power is selectively supplied to the first and the second antenna conductors.

10. The antenna apparatus as claimed in claim 9, wherein the first antenna conductor is arranged in a spiral form, and the second antenna conductor is arranged in a linear form.

11. The antenna apparatus as claimed in claim 9, wherein the first antenna conductor is arranged in a spiral form, the second antenna conductor is arranged in a linear form, and one end of the second antenna conductor is connected to a base portion of the first antenna conductor.

12. The antenna apparatus as claimed in claim 9, wherein feeding to the first antenna conductor is performed through an electromagnetic coupling element.

* * * * *